(12) United States Patent
Zou et al.

(10) Patent No.: US 12,107,507 B2
(45) Date of Patent: Oct. 1, 2024

(54) DUAL ACTIVE BRIDGE CONVERTER CONTROL WITH SWITCHING LOSS DISTRIBUTION

(71) Applicant: RIVIAN IP HOLDINGS, LLC, Irvine, CA (US)

(72) Inventors: Shenli Zou, Redondo Beach, CA (US); Zahra Mohajerani, Los Angeles, CA (US); Maziar Mobarrez, Irvine, CA (US); Lixiang Wei, Irvine, CA (US)

(73) Assignee: RIVIAN IP HOLDINGS, LLC, Irvine, CA (US)

( * ) Notice: Subject to any disclaimer, the term of this patent is extended or adjusted under 35 U.S.C. 154(b) by 0 days.

(21) Appl. No.: 17/749,492

(22) Filed: May 20, 2022

(65) Prior Publication Data

US 2023/0064783 A1 Mar. 2, 2023

Related U.S. Application Data

(60) Provisional application No. 63/240,137, filed on Sep. 2, 2021.

(51) Int. Cl.
*H02M 3/335* (2006.01)
*H02M 1/00* (2006.01)

(52) U.S. Cl.
CPC ..... *H02M 3/33573* (2021.05); *H02M 1/0054* (2021.05); *H02M 3/33576* (2013.01)

(58) Field of Classification Search
CPC .......... H02M 1/0054; H02M 3/33573; H02M 3/33576; H02M 3/335; Y02B 70/10; Y02T 10/70; Y02T 10/7072
See application file for complete search history.

(56) References Cited

U.S. PATENT DOCUMENTS

| | | | | |
|---|---|---|---|---|
| 5,923,550 | A | * | 7/1999 | Kumar ................ H02M 7/1626 363/69 |
| 6,075,717 | A | * | 6/2000 | Kumar ................ H02M 5/4505 363/69 |
| 10,122,367 | B1 | * | 11/2018 | Albertini .......... H02M 3/33584 |
| 10,749,441 | B1 | * | 8/2020 | Singh ................ H02M 3/33584 |
| 10,804,808 | B1 | * | 10/2020 | Fu ...................... H02M 3/33576 |

(Continued)

FOREIGN PATENT DOCUMENTS

CN        107070241 A        8/2017

OTHER PUBLICATIONS

Hiti, S. et al., "Zero vector modulation method for voltage source inverter operating near zero output frequency", Conference Record of the 2004 IEEE Industry Applications Conference, 171-176 (2004).

*Primary Examiner* — Yusef A Ahmed
(74) *Attorney, Agent, or Firm* — Haley Guiliano LLP

(57) ABSTRACT

Systems and methods for controlling a dual active bridge converter are disclosed herein. Switch control signals are provided to respective switches of at least one bridge of a dual active bridge converter. Control circuitry causes the switch control signals to switch according to a first switching sequence. After causing the switch control signals to switch according to the first switching sequence, the control circuitry causes the switch control signals to switch according to a second switching sequence, distinct from the first switching sequence, to distribute switching losses among the switches.

20 Claims, 14 Drawing Sheets

(56) References Cited

U.S. PATENT DOCUMENTS

| | | | |
|---|---|---|---|
| 11,292,352 B1* | 4/2022 | Keister | B60L 55/00 |
| 2002/0191418 A1* | 12/2002 | Clayton | H02M 3/33507 |
| | | | 363/17 |
| 2009/0174440 A1* | 7/2009 | Man | H02M 3/156 |
| | | | 327/114 |
| 2011/0249472 A1 | 10/2011 | Jain et al. | |
| 2012/0294045 A1* | 11/2012 | Fornage | H02M 7/217 |
| | | | 363/17 |
| 2012/0300524 A1* | 11/2012 | Fornage | H02M 5/297 |
| | | | 363/132 |
| 2013/0063056 A1* | 3/2013 | Takahashi | H02P 21/22 |
| | | | 318/400.02 |
| 2014/0132203 A1* | 5/2014 | Schillinger | B60L 50/15 |
| | | | 320/137 |
| 2014/0160800 A1* | 6/2014 | Zimmanck | H02M 5/293 |
| | | | 363/17 |
| 2014/0183953 A1* | 7/2014 | Harrison | H02M 7/4807 |
| | | | 307/52 |
| 2014/0268897 A1* | 9/2014 | Zimmanck | H02M 3/3353 |
| | | | 363/17 |
| 2015/0049518 A1* | 2/2015 | Harrison | H02M 7/4807 |
| | | | 363/17 |
| 2015/0097434 A1* | 4/2015 | Harrison | H02M 7/4807 |
| | | | 307/43 |
| 2015/0109827 A1* | 4/2015 | Poshtkouhi | H02M 3/33584 |
| | | | 363/17 |
| 2015/0280455 A1* | 10/2015 | Bosshard | B60L 53/122 |
| | | | 307/104 |
| 2016/0020702 A1* | 1/2016 | Trescases | H02M 3/33592 |
| | | | 363/17 |
| 2016/0276941 A1* | 9/2016 | Iwaya | H02M 3/3376 |
| 2017/0025961 A1* | 1/2017 | Seeman | H02M 3/33546 |
| 2017/0170738 A1* | 6/2017 | El-Barbari | H02M 3/33576 |
| 2017/0310229 A1* | 10/2017 | Fujisaki | H02M 3/33507 |
| 2017/0370977 A1* | 12/2017 | El-Barbari | G01R 15/18 |
| 2018/0048240 A1* | 2/2018 | Hayasaki | H02M 3/33507 |
| 2018/0154786 A1* | 6/2018 | Wang | B60L 53/24 |
| 2018/0219480 A1* | 8/2018 | Hezar | H02M 1/44 |
| 2018/0219485 A1* | 8/2018 | Babazadeh | H02M 3/3376 |
| 2019/0097544 A1* | 3/2019 | Albertini | H03L 7/0807 |
| 2020/0021198 A1* | 1/2020 | Miyazaki | H02M 3/33576 |
| 2020/0083815 A1 | 3/2020 | Zhang et al. | |
| 2020/0144926 A1* | 5/2020 | Murakami | H02M 3/33573 |
| 2020/0177089 A1* | 6/2020 | Abdel-Rahman | H02M 1/36 |
| 2020/0195132 A1* | 6/2020 | Tsou | H02M 3/33515 |
| 2020/0231064 A1* | 7/2020 | Zhao | B60L 50/64 |
| 2020/0313249 A1* | 10/2020 | Zhao | G06Q 10/087 |
| 2020/0362823 A1* | 11/2020 | Helle | H02M 1/0054 |
| 2021/0028712 A1* | 1/2021 | Yu | H01F 30/16 |
| 2021/0061125 A1* | 3/2021 | Nasr | H02M 3/335 |
| 2021/0249962 A1* | 8/2021 | Watanabe | H02M 1/0054 |
| 2021/0249963 A1* | 8/2021 | Kajiyama | H02M 3/33573 |
| 2021/0344283 A1* | 11/2021 | Zhou | H02M 3/1582 |
| 2021/0384840 A1* | 12/2021 | Kumar | H02M 1/32 |
| 2021/0408889 A1* | 12/2021 | Zhu | H02J 7/02 |
| 2022/0021311 A1* | 1/2022 | Ishibashi | H02M 1/0058 |
| 2022/0045618 A1* | 2/2022 | Kumar | H02J 7/007 |
| 2022/0103081 A1* | 3/2022 | Sheng | H02M 3/285 |
| 2022/0103083 A1* | 3/2022 | Zhou | H02M 1/348 |
| 2022/0278625 A1* | 9/2022 | Hirota | H02M 1/0058 |
| 2022/0360182 A1* | 11/2022 | Hirota | H02M 3/33592 |
| 2022/0399819 A1* | 12/2022 | Mohan | H02M 3/33569 |
| 2022/0407426 A1* | 12/2022 | Takeshita | H02M 3/01 |
| 2023/0040992 A1* | 2/2023 | Wei | H02M 3/33573 |
| 2023/0066489 A1* | 3/2023 | Zou | B60L 53/14 |
| 2023/0155514 A1* | 5/2023 | Saha | H02M 1/0058 |
| | | | 363/17 |

* cited by examiner

602-1

First Switching Sequence (Primary Bridge) — 608-1

| Stage (606-1) | Time Index Range (608-1) | Switch (610-1) | Switch Control Signal Value (612-1) |
|---|---|---|---|
| 1 | TimeRange$_{sw1seq1stg1}$ | 1 | 1 |
| 1 | TimeRange$_{sw2seq1stg1}$ | 2 | 0 |
| 1 | TimeRange$_{sw3seq1stg1}$ | 3 | 0 |
| 1 | TimeRange$_{sw4seq1stg1}$ | 4 | 1 |
| 2 | TimeRange$_{sw1seq1stg2}$ | 1 | 1 |
| 2 | TimeRange$_{sw2seq1stg2}$ | 2 | 0 |
| 2 | TimeRange$_{sw3seq1stg2}$ | 3 | 1 |
| 2 | TimeRange$_{sw4seq1stg2}$ | 4 | 0 |
| 3 | TimeRange$_{sw1seq1stg3}$ | 1 | 0 |
| 3 | TimeRange$_{sw2seq1stg3}$ | 2 | 1 |
| 3 | TimeRange$_{sw3seq1stg3}$ | 3 | 1 |
| 3 | TimeRange$_{sw4seq1stg3}$ | 4 | 0 |
| 4 | TimeRange$_{sw1seq1stg4}$ | 1 | 0 |
| 4 | TimeRange$_{sw2seq1stg4}$ | 2 | 1 |
| 4 | TimeRange$_{sw3seq1stg4}$ | 3 | 0 |
| 4 | TimeRange$_{sw4seq1stg4}$ | 4 | 1 |

604-1

Second Switching Sequence (Primary Bridge) — 616-1

| Stage (614-1) | Time Index Range (616-1) | Switch (618-1) | Switch Control Signal Value (620-1) |
|---|---|---|---|
| 5 | TimeRange$_{sw1seq2stg5}$ | 1 | 1 |
| 5 | TimeRange$_{sw2seq2stg5}$ | 2 | 0 |
| 5 | TimeRange$_{sw3seq2stg5}$ | 3 | 0 |
| 5 | TimeRange$_{sw4seq2stg5}$ | 4 | 1 |
| 6 | TimeRange$_{sw1seq2stg6}$ | 1 | 0 |
| 6 | TimeRange$_{sw2seq2stg6}$ | 2 | 1 |
| 6 | TimeRange$_{sw3seq2stg6}$ | 3 | 0 |
| 6 | TimeRange$_{sw4seq2stg6}$ | 4 | 1 |
| 7 | TimeRange$_{sw1seq2stg7}$ | 1 | 0 |
| 7 | TimeRange$_{sw2seq2stg7}$ | 2 | 1 |
| 7 | TimeRange$_{sw3seq2stg7}$ | 3 | 1 |
| 7 | TimeRange$_{sw4seq2stg7}$ | 4 | 0 |
| 8 | TimeRange$_{sw1seq2stg8}$ | 1 | 1 |
| 8 | TimeRange$_{sw2seq2stg8}$ | 2 | 0 |
| 8 | TimeRange$_{sw3seq2stg8}$ | 3 | 1 |
| 8 | TimeRange$_{sw4seq2stg8}$ | 4 | 0 |

FIG. 6A

First Switching Sequence (Secondary Bridge)

| Stage | Time Index Range | Switch | Switch Control Signal Value |
|---|---|---|---|
| 1 | TimeRange$_{sw5seq1stg1}$ | 5 | 1 |
| 1 | TimeRange$_{sw6seq1stg1}$ | 6 | 0 |
| 1 | TimeRange$_{sw7seq1stg1}$ | 7 | 0 |
| 1 | TimeRange$_{sw8seq1stg1}$ | 8 | 1 |
| 2 | TimeRange$_{sw5seq1stg2}$ | 5 | 1 |
| 2 | TimeRange$_{sw6seq1stg2}$ | 6 | 0 |
| 2 | TimeRange$_{sw7seq1stg2}$ | 7 | 1 |
| 2 | TimeRange$_{sw8seq1stg2}$ | 8 | 0 |
| 3 | TimeRange$_{sw5seq1stg3}$ | 5 | 0 |
| 3 | TimeRange$_{sw6seq1stg3}$ | 6 | 1 |
| 3 | TimeRange$_{sw7seq1stg3}$ | 7 | 1 |
| 3 | TimeRange$_{sw8seq1stg3}$ | 8 | 0 |
| 4 | TimeRange$_{sw5seq1stg4}$ | 5 | 0 |
| 4 | TimeRange$_{sw6seq1stg4}$ | 6 | 1 |
| 4 | TimeRange$_{sw7seq1stg4}$ | 7 | 0 |
| 4 | TimeRange$_{sw8seq1stg4}$ | 8 | 1 |

Second Switching Sequence (Secondary Bridge)

| Stage | Time Index Range | Switch | Switch Control Signal Value |
|---|---|---|---|
| 5 | TimeRange$_{sw5seq2stg5}$ | 5 | 1 |
| 5 | TimeRange$_{sw6seq2stg5}$ | 6 | 0 |
| 5 | TimeRange$_{sw7seq2stg5}$ | 7 | 0 |
| 5 | TimeRange$_{sw8seq2stg5}$ | 8 | 1 |
| 6 | TimeRange$_{sw5seq2stg6}$ | 5 | 0 |
| 6 | TimeRange$_{sw6seq2stg6}$ | 6 | 1 |
| 6 | TimeRange$_{sw7seq2stg6}$ | 7 | 0 |
| 6 | TimeRange$_{sw8seq2stg6}$ | 8 | 1 |
| 7 | TimeRange$_{sw5seq2stg7}$ | 5 | 0 |
| 7 | TimeRange$_{sw6seq2stg7}$ | 6 | 1 |
| 7 | TimeRange$_{sw7seq2stg7}$ | 7 | 1 |
| 7 | TimeRange$_{sw8seq2stg7}$ | 8 | 0 |
| 8 | TimeRange$_{sw5seq2stg8}$ | 5 | 1 |
| 8 | TimeRange$_{sw6seq2stg8}$ | 6 | 0 |
| 8 | TimeRange$_{sw7seq2stg8}$ | 7 | 1 |
| 8 | TimeRange$_{sw8seq2stg8}$ | 8 | 0 |

FIG. 6B

DUAL ACTIVE BRIDGE CONVERTER CONTROL WITH SWITCHING LOSS DISTRIBUTION

CROSS-REFERENCE TO RELATED APPLICATION

This application claims the benefit under 35 U.S.C. § 119(e) of U.S. Provisional Patent Application No. 63/240,137, filed on Sep. 2, 2021, the content of which is hereby expressly incorporated by reference in its entirety.

INTRODUCTION

The present disclosure relates to dual active bridge converters and, more particularly, to systems and related processes for controlling a dual active bridge converter in a manner that improves its efficiency rating by distributing (e.g., balancing) switching loss among its switches.

SUMMARY

Dual active bridge converters, such as those operating in a buck-boost mode, are utilized to provide direct current-to-direct current (DC-DC) conversion for a multitude of applications. One such application is an electric vehicle charging station, in which a dual active bridge converter receives a DC voltage derived from an AC power grid, converts the received DC voltage to another DC voltage, and provides the converted DC voltage to a charging port of an electric vehicle. The present disclosure provides systems and methods for controlling a dual active bridge converter in a manner that improves its power efficiency rating by distributing (e.g., balancing) switching loss (e.g., turn-off switching loss) among its switches. Such control of a dual active bridge converter is advantageous over that of conventionally controlled dual active bridge converters, which have power efficiency ratings that are limited by unbalanced thermal performance in switches. In particular, conventional dual active bridge converters are controlled by pulse width modulation (PWM) switch control signal patterns that lead to dissimilar switching characteristics for switches of different bridge legs. Such conventional PWM switch control signal patterns lead to a difference in turn-off switching losses among bridge legs as well as a thermal difference among bridge legs, thereby limiting the power efficiency rating of the dual active bridge converter.

The present disclosure provides systems and related methods that utilizes periodic or aperiodic swapping of PWM patterns to control switches of one or more bridges of a dual active bridge converter to distribute (e.g., balance) switching loss (e.g., turn-off switching loss) among its switches to yields improved efficiency. According to one example method, switch control signals are provided to respective switches of at least one bridge of a dual active bridge converter. Control circuitry causes the switch control signals to switch according to a first switching sequence. After causing the switch control signals to switch according to the first switching sequence, the control circuitry causes the switch control signals to switch according to a second switching sequence, distinct from the first switching sequence, to distribute switching losses among the switches.

The switch control signals, in one aspect, include a first switch control signal, a second switch control signal, a third switch control signal, and a fourth switch control signal, coupled to a first switch, a second switch, a third switch and a fourth switch, respectively, of the switches of the at least one bridge of the dual active bridge converter. The first switching sequence includes sequentially stepping through a first stage during which the first and fourth switch control signals are enabled, a second stage during which the first and third switch control signals are enabled, a third stage during which the second and third switch control signals are enabled, and a fourth stage during which the second and fourth switch control signals are enabled. The second switching sequence includes sequentially stepping through a fifth stage during which the first and fourth switch control signals are enabled, a sixth stage during which the second and fourth switch control signals are enabled, a seventh stage during which the second and third switch control signals are enabled, and an eighth stage during which the first and third switch control signals are enabled.

The method, in yet another example, further includes causing the first switch control signal to have a value complementary to a value of the second switch control signal, and causing the third switch control signal to have a value complementary to a value of the fourth switch control signal.

In another aspect, the method further includes repetitively toggling (e.g., on a periodic basis) between causing the switches to switch according to the first switching sequence and causing the switches to switch according to the second switching sequence.

The dual active bridge converter, in some examples, includes a transformer having a primary side and a secondary side. In one example, the switch control signals may be provided to respective switches of a primary bridge of the dual active bridge converter coupled to the primary side of the transformer. In another example, the switch control signals may be provided to respective switches of a secondary bridge of the dual active bridge converter coupled to the secondary side of the transformer.

In another aspect, the method further includes determining, based on a swapping frequency, a time at which to toggle between causing the switches to switch according to the first switching sequence and causing the switches to switch according to the second switching sequence. For instance, a temperature of at least one of the switches may be sensed and the swapping frequency may be adjusted based on the temperature.

In an example where the dual active bridge converter includes a transformer having a primary side and a secondary side, the method may further include sensing a temperature of at least one of the switches, and selecting, as the at least one bridge of the dual active bridge converter, at least one of (i) a primary bridge of the dual active bridge converter coupled to the primary side of the transformer or (ii) a secondary bridge of the dual active bridge converter coupled to the secondary side of the transformer, based on the sensed temperature.

The method, in another aspect, further includes retrieving, from memory, data defining at least one of the first switching sequence or the second switching sequence. In such an aspect, the switch control signals may be caused to switch according to at least one of the first switching sequence or the second switching sequence based on the retrieved data.

In accordance with another aspect of the disclosure, a system for controlling a dual active bridge converter is described. The system includes control circuitry, a memory storing instructions, and output ports. The control circuitry, which is coupled to the memory and the output ports, is configured to execute the instructions to provide switch control signals via the output ports to respective switches of at least one bridge of the dual active bridge converter. The control circuitry causes the switch control signals to switch according to a first switching sequence, and, after causing the switch control signals to switch according to the first switching sequence, causes the switch control signals to switch according to a second switching sequence, distinct from the first switching sequence, to distribute switching losses among the switches.

The switch control signals, in one aspect, include a first switch control signal, a second switch control signal, a third switch control signal, and a fourth switch control signal, coupled to a first switch, a second switch, a third switch and a fourth switch, respectively, of the switches of the at least one bridge of the dual active bridge converter. The first switching sequence includes sequentially stepping through a first stage during which the first and fourth switch control signals are enabled, a second stage during which the first and third switch control signals are enabled, a third stage during which the second and third switch control signals are enabled, and a fourth stage during which the second and fourth switch control signals are enabled. The second switching sequence includes sequentially stepping through a fifth stage during which the first and fourth switch control signals are enabled, a sixth stage during which the second and fourth switch control signals are enabled, a seventh stage during which the second and third switch control signals are enabled, and an eighth stage during which the first and third switch control signals are enabled.

The control circuitry, in yet another example, is further configured to execute the instructions to cause the first switch control signal to have a value complementary to a value of the second switch control signal, and cause the third switch control signal to have a value complementary to a value of the fourth switch control signal.

In another aspect, the control circuitry is further configured to execute the instructions to repetitively toggle between causing the switches to switch according to the first switching sequence and causing the switches to switch according to the second switching sequence.

The dual active bridge converter, in some examples, includes a transformer having a primary side and a secondary side. In one example, the switch control signals are provided to respective switches of a primary bridge of the dual active bridge converter coupled to the primary side of the transformer. In another example, the switch control signals are provided to respective switches of a secondary bridge of the dual active bridge converter coupled to the secondary side of the transformer.

In another aspect, the control circuitry is further configured to execute the instructions to determine, based on a swapping frequency, a time at which to toggle between causing the switches to switch according to the first switching sequence and causing the switches to switch according to the second switching sequence. For instance, the control circuitry may receive, from a sensor, a temperature signal or data indicating a temperature of at least one of the switches, and adjust the swapping frequency based on the temperature.

In an example where the dual active bridge converter includes a transformer having a primary side and a secondary side, the control circuitry may further be configured to execute the instructions to receive, from a sensor, a temperature of at least one of the switches, and select, as the at least one bridge of the dual active bridge converter, at least one of (i) a primary bridge of the dual active bridge converter coupled to the primary side of the transformer or (ii) a secondary bridge of the dual active bridge converter coupled to the secondary side of the transformer, based on the sensed temperature.

In another aspect, the memory is further configured to store data defining at least one of the first switching sequence or the second switching sequence, and the control circuitry is further configured to execute the instructions to retrieve the data from the memory, and cause the switch control signals to switch according to at least one of the first switching sequence or the second switching sequence based on the retrieved data.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 6A depicts data structures for an illustrative time-based first switching sequence and second switching sequence for utilization in controlling switches of a primary bridge of a dual active bridge converter with switching loss distribution, in accordance with some embodiments of the disclosure;

FIG. 6B depicts data structures for an illustrative time-based first switching sequence and second switching sequence for utilization in controlling switches of a secondary bridge of a dual active bridge converter with switching loss distribution, in accordance with some embodiments of the disclosure;

DETAILED DESCRIPTION

Figure 1:
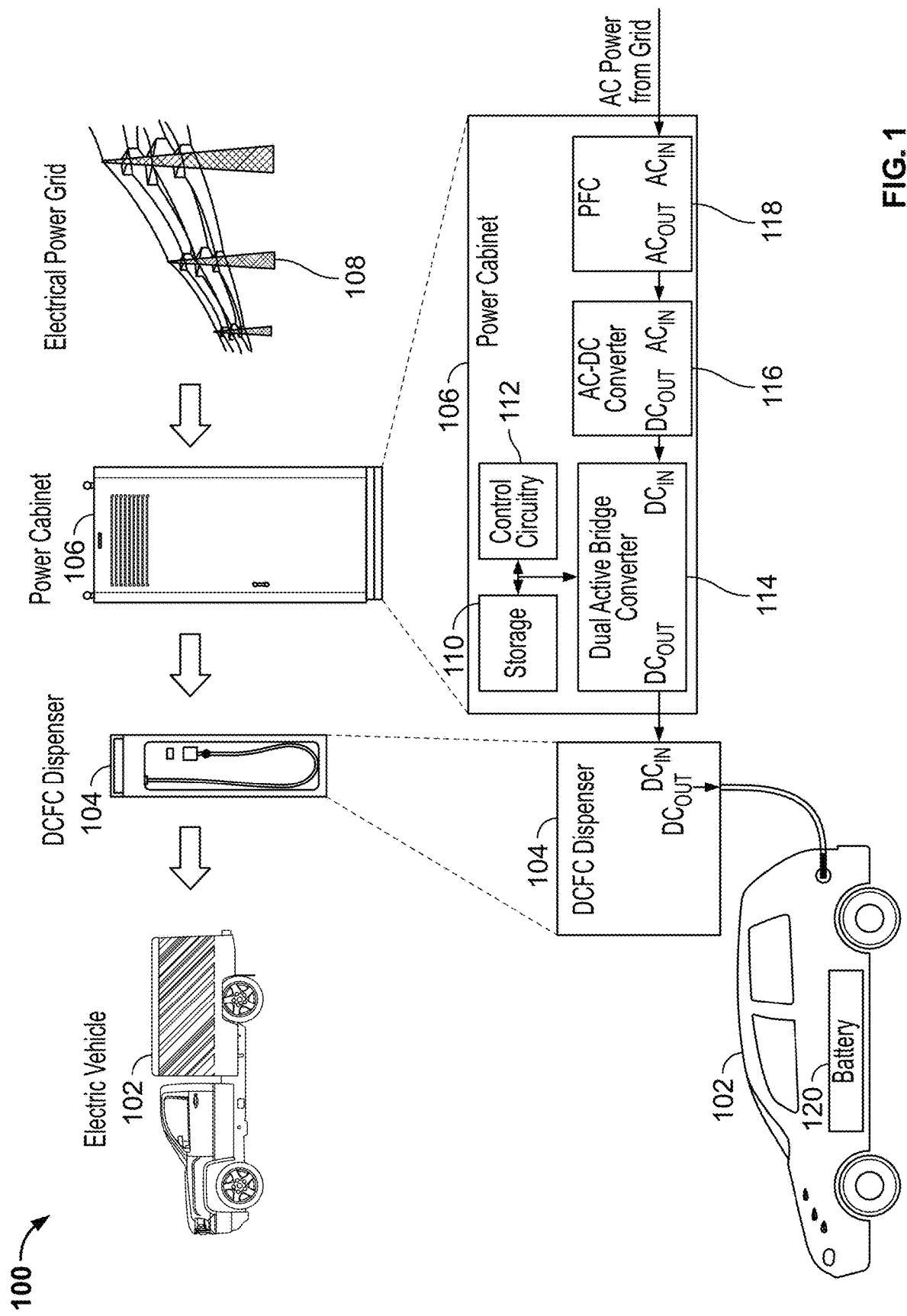
FIG. 1 shows an illustrative block diagram of an electric vehicle charging system including a dual active bridge converter with switching loss distribution, in accordance with some embodiments of the disclosure.

FIG. 1 shows an illustrative block diagram of an electric vehicle charging system 100 including a dual active bridge converter with switching loss distribution, in accordance with some embodiments of the disclosure. System 100 includes electric vehicle 102, direct current fast charger (DCFC) dispenser 104, power cabinet 106, and electrical power grid 108. Electric vehicle 102 includes rechargeable battery 120. Power cabinet 106 includes storage 110, control circuitry 112, dual active bridge (DAB) converter 114, AC-DC converter 116, and power factor correction (PFC) circuitry 118. Power cabinet 106 is coupled to electrical power grid 108 via one or more wired electrical power signal paths, by which electrical power grid 108 provides alternating current (AC) electrical power, such as in the form of a three-phase 480 volt (V) 60 hertz (Hz) signal, to power cabinet 106. PFC circuitry 118 performs power factor correction upon the AC electrical power received from electrical power grid 108, and outputs a power factor corrected AC power signal to AC-DC converter 116. AC-DC converter 116 converts the power factor corrected AC power signal received from PFC circuitry 118 into a DC signal, such as a signal fixed at a voltage in a range from 200 to 920 V and a maximum current of 500 amps (A) at a maximum power of 300 kilowatts (kW). AC-DC converter 116 provides the DC signal to DAB converter 114, which converts the received DC signal into an output DC signal that is provided, by way of DCFC dispenser 104, to charge battery 120 via a charging port of electric vehicle 102. As described in further detail below, control circuitry 112, which is electrically coupled to storage 110 and DAB converter 114, is configured to control DAB converter 114 to transfer power to battery 120 in an efficient manner by distributing (e.g., balancing) switching loss (e.g., turn-off switching loss) among its switches.

Figure 2:
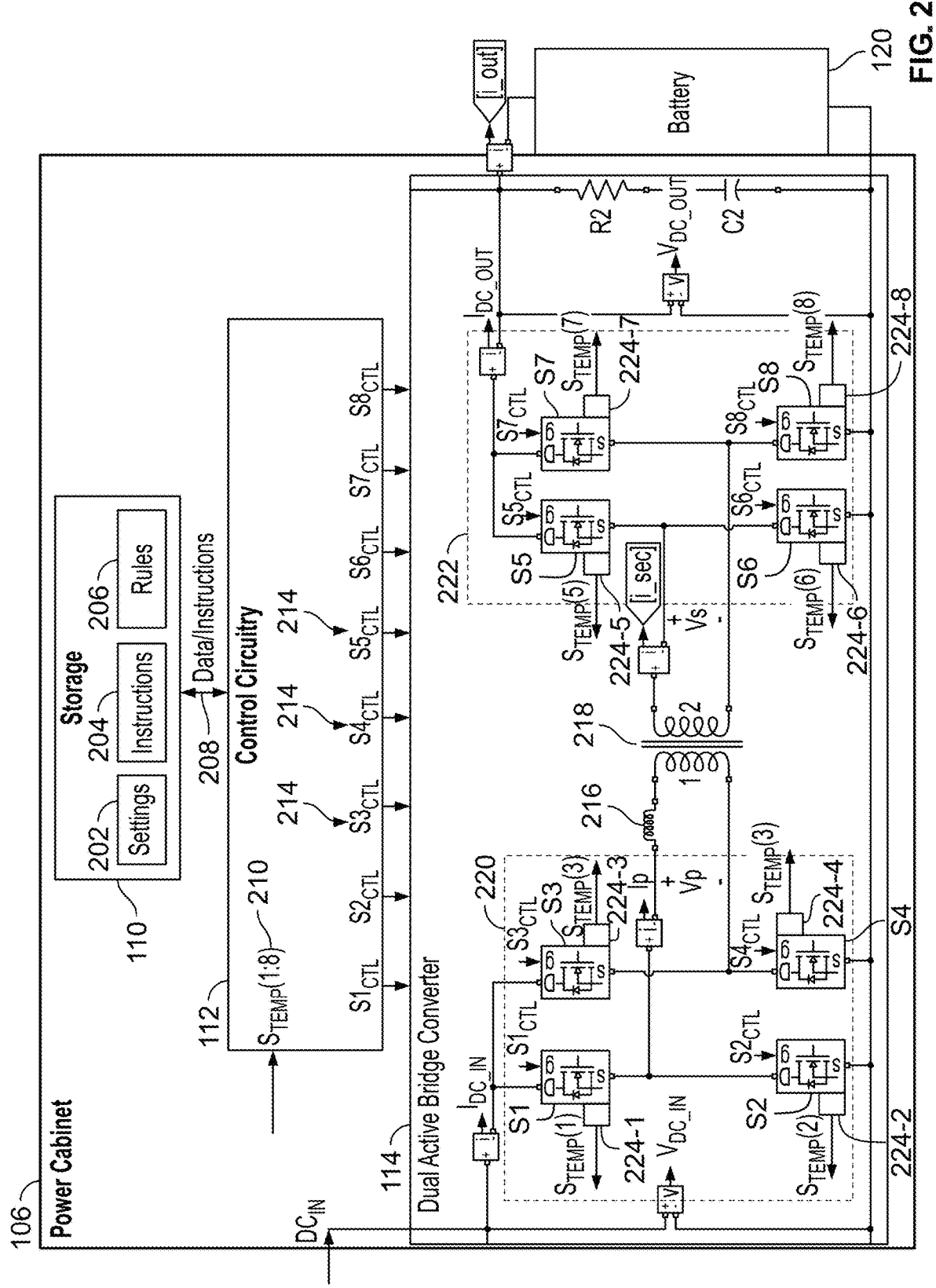
FIG. 2 is an illustrative block diagram showing additional details of a direct current fast charger dispenser of the electric vehicle charging system of FIG. 1, in accordance with some embodiments of the disclosure.

FIG. 2 is an illustrative block diagram showing additional details of some components of power cabinet 106, in accordance with some embodiments of the disclosure. Storage 110 may be an electronic storage device. As referred to herein, the phrase "electronic storage device" or "storage device" should be understood to mean any device for storing electronic data, computer software, or firmware, such as random-access memory, read-only memory, solid state devices, or any other suitable fixed or removable storage devices, and/or any combination of the same. Storage 110 may be used to store various types of instructions, rules, and/or other types of data. In some embodiments, control circuitry 112 executes instructions for an application stored in storage 110. Specifically, control circuitry 112 may be instructed by the application to perform the functions discussed herein. In some implementations, any action performed by control circuitry 112 may be based on instructions received from the application. For example, the application may be implemented as software or a set of executable instructions that may be stored in storage 110 and executed by control circuitry 112.

Storage 110, in some aspects, stores settings 202, instructions 204, and rules 206. Example types of settings 202 may include temperature thresholds, swapping frequency settings, and/or other types of settings. Example types of rules 206 include computational constants (e.g., values of inductors and/or transformers of DAB converter 114), look-up-tables (e.g., such as data structures 602-1, 602-2 and/or 604-1, 604-2 in FIGS. 6A and 6B) that define switching sequences, and/or other types of information or data. In some aspects, instructions 204 are executed by control circuitry 112 to implement steps of various methods described herein.

DAB converter 114 includes transformer 218, a primary side bridge 220 and a secondary side bridge 222. Primary side bridge 220 is coupled to a primary side of transformer 218 via series inductor 216. Secondary side bridge 222 is coupled to a secondary side of transformer 218. As used herein, the "primary side" of DAB converter 114 refers to the portion of DAB converter 114 appearing to the left of transformer 218 in FIG. 2, and the "secondary side" of DAB converter 114 refers to the portion of DAB converter 114 appearing to the right of transformer 218 in FIG. 2. As used herein, Vp and Vs refer to the voltage on the primary side of transformer 218 and the voltage on the secondary side of transformer 218, respectively. DAB converter 114 also includes primary side switches S1, S2, S3, and S4 located on the primary side of DAB converter 114 and secondary side switches S5, S6, S7, and S8 located on the secondary side of DAB converter 114. Switches S1, S2, S3, S4, S5, S6, S7, and S8 may be any suitable type of electronic switch, such as a field effect transistor (FET)-based switch, that can be switched on/closed (e.g., during which current is permitted to be conducted between its source and drain terminal) or off/open (e.g., during which current is effectively prevented from being conducted between its source and drain terminal) by changing a logic level of the control signal provided to its gate terminal, for example from a logic-high to a logic-low. In one aspect, temperature sensors 224-1, 224-2, 224-3, 224-4, 224-5, 224-6, 224-7, and 224-8, are coupled to, and configured to sense the temperatures of, switches S1, S2, S3, S4, S5, S6, S7, and S8, respectively. Temperature sensors 224-1, 224-2, 224-3, 224-4, 224-5, 224-6, 224-7, and 224-8, output to control circuitry 112 signals ($S_{TEMP}(1)$ through $S_{TEMP}(8)$, collectively, $S_{TEMP}(1:8)$) indicating sensed temperatures of switches S1 through S8, respectively. Complete signal paths from output ports $S_{TEMP}(1)$ through $S_{TEMP}(8)$ of temperature sensors 224-1, 224-2, 224-3, 224-4, 224-5, 224-6, 224-7, and 224-8 to temperature input port 210 ($S_{TEMP}(1:8)$) of control circuitry 112 are omitted from FIG. 2 for clarity. Nonetheless, output ports $S_{TEMP}(1)$ through $S_{TEMP}(8)$ of temperature sensors 224-1, 224-2, 224-3, 224-4, 224-5, 224-6, 224-7, and 224-8 are indeed coupled to temperature input port 210 ($S_{TEMP}(1:8)$) of control circuitry 112 via a signal bus or other suitable respective signal paths.

Control circuitry 112 includes storage interface port 208, temperature input port 210 ($S_{TEMP}(1:8)$), and multiple output ports 214. Control circuitry 112 is configured to transmit and receive instructions, settings, rules, and/or other types of data to and from storage 110 via storage interface port 208. Control circuitry 112 is configured to receive signals $S_{TEMP}(1)$ through $S_{TEMP}(8)$ indicating sensed temperatures of switches S1 through S8, via first input port 210.

Output ports 214 include primary switching control ports $S1_{CTL}$, $S2_{CTL}$, $S3_{CTL}$, and $S4_{CTL}$, by which control circuitry 112 provides respective switch control signals to respective switching control ports $S1_{CTL}$, $S2_{CTL}$, $S3_{CTL}$, and $S4_{CTL}$ of primary side switches S1, S2, S3, and S4. Output ports 214 also include secondary switching control ports $S5_{CTL}$, $S6_{CTL}$, $S7_{CTL}$, and $S8_{CTL}$, by which control circuitry 112 provides respective switch control signals to respective switching control ports $S5_{CTL}$, $S6_{CTL}$, $S7_{CTL}$, and $S8_{CTL}$ of secondary side switches S5, S6, S7, and S8, respectively. Complete signal paths from switching control ports $S1_{CTL}$, $S2_{CTL}$, $S3_{CTL}$, $S4_{CTL}$, $S5_{CTL}$, $S6_{CTL}$, $S7_{CTL}$, and $S8_{CTL}$ of control circuitry 112 to $S1_{CTL}$, $S2_{CTL}$, $S3_{CTL}$, $S4_{CTL}$, $S5_{CTL}$, $S6_{CTL}$, $S7_{CTL}$, and $S8_{CTL}$ of DAB 114 are omitted from FIG. 2 for clarity. Nonetheless, switching control ports $S1_{CTL}$, $S2_{CTL}$, $S3_{CTL}$, $S4_{CTL}$, $S5_{CTL}$, $S6_{CTL}$, $S7_{CTL}$, and $S8_{CTL}$ of control circuitry 112 are indeed coupled to $S1_{CTL}$, $S2_{CTL}$, $S3_{CTL}$, $S4_{CTL}$, $S5_{CTL}$, $S6_{CTL}$, $S7_{CTL}$, and $S8_{CTL}$ of DAB 114 via respective signal paths. As described in further detail below, in some aspects, control circuitry 112 is configured to cause switch control signals (e.g., switch control signals $S1_{CTL}$, $S2_{CTL}$, $S3_{CTL}$, $S4_{CTL}$ of primary side bridge 220, and/or switch control signals $S5_{CTL}$, $S6_{CTL}$, $S7_{CTL}$, and $S8_{CTL}$ of secondary side bridge 222) to switch according to a first switching sequence, and, after causing such switch control signals to switch according to the first switching sequence, cause the switch control signals to switch according to a second switching sequence, distinct from the first switching sequence, to distribute switching losses among the switches.

Figure 3:
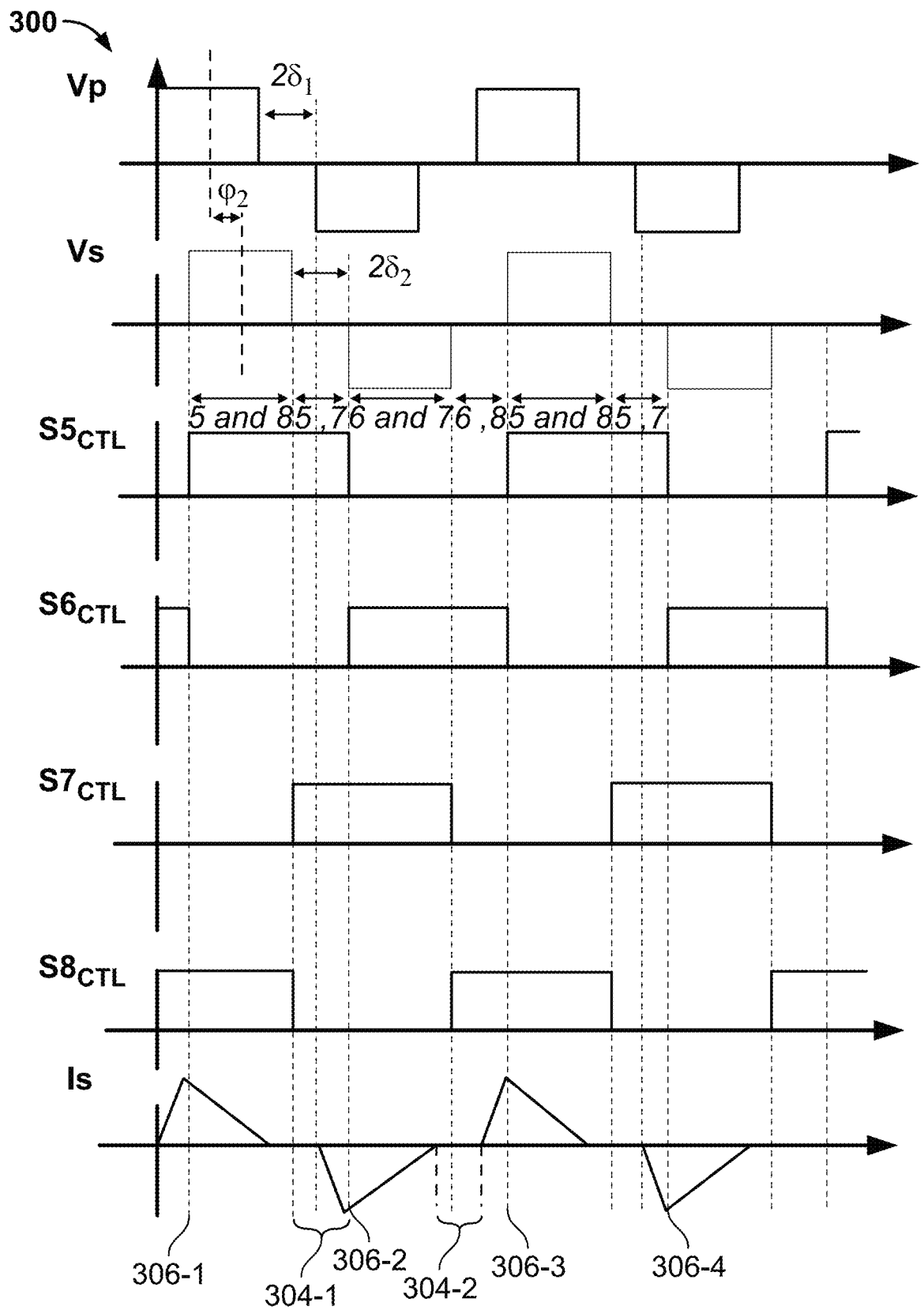
FIG. 3 depicts an illustrative voltage timing diagram of switch control signals of a dual active bridge converter without switching loss distribution.

FIG. 3 depicts an illustrative voltage timing diagram 300 of a conventional PWM switching pattern of switch control signals $S5_{CTL}$, $S6_{CTL}$, $S7_{CTL}$, and $S8_{CTL}$, of a secondary bridge of a DAB converter without switching loss distribution, and of primary (Vp) and secondary (Vs) voltages of transformer 218 that result from such a switching pattern. During the circulating period of a full bridge (e.g., a secondary bridge), zero current occurs in the transformer because circulating current flows within either the top switches (e.g., S5 and S7) or the bottom switches (e.g., S6 and S8). The control sequence of top or bottom switches for zero current determines the switching loss distribution of the full bridge. As shown in FIG. 3, switch S5 and switch S7 are on (e.g., logic level high) during a first zero current interval 304-1 (e.g., when secondary current (Is) equals zero), and switch S6 and switch S8 are on during a second zero current interval 304-2. Either switch S5 or switch S6 is periodically turned off at the peak current level 306-1, 306-2, 306-3, or 306-4 (e.g., while the current (Is) is at a maximum value), and the bridge leg that includes switch S5 and switch S6 has a higher switching loss (e.g., turn-off switching loss) compared to the bridge leg that includes switch S7 and switch S8. Such conventional PWM switch control signal patterns lead to a difference in turn-off switching losses among bridge legs as well as a thermal difference among bridge legs, thereby limiting the power efficiency rating of the dual active bridge converter.

Figure 4:
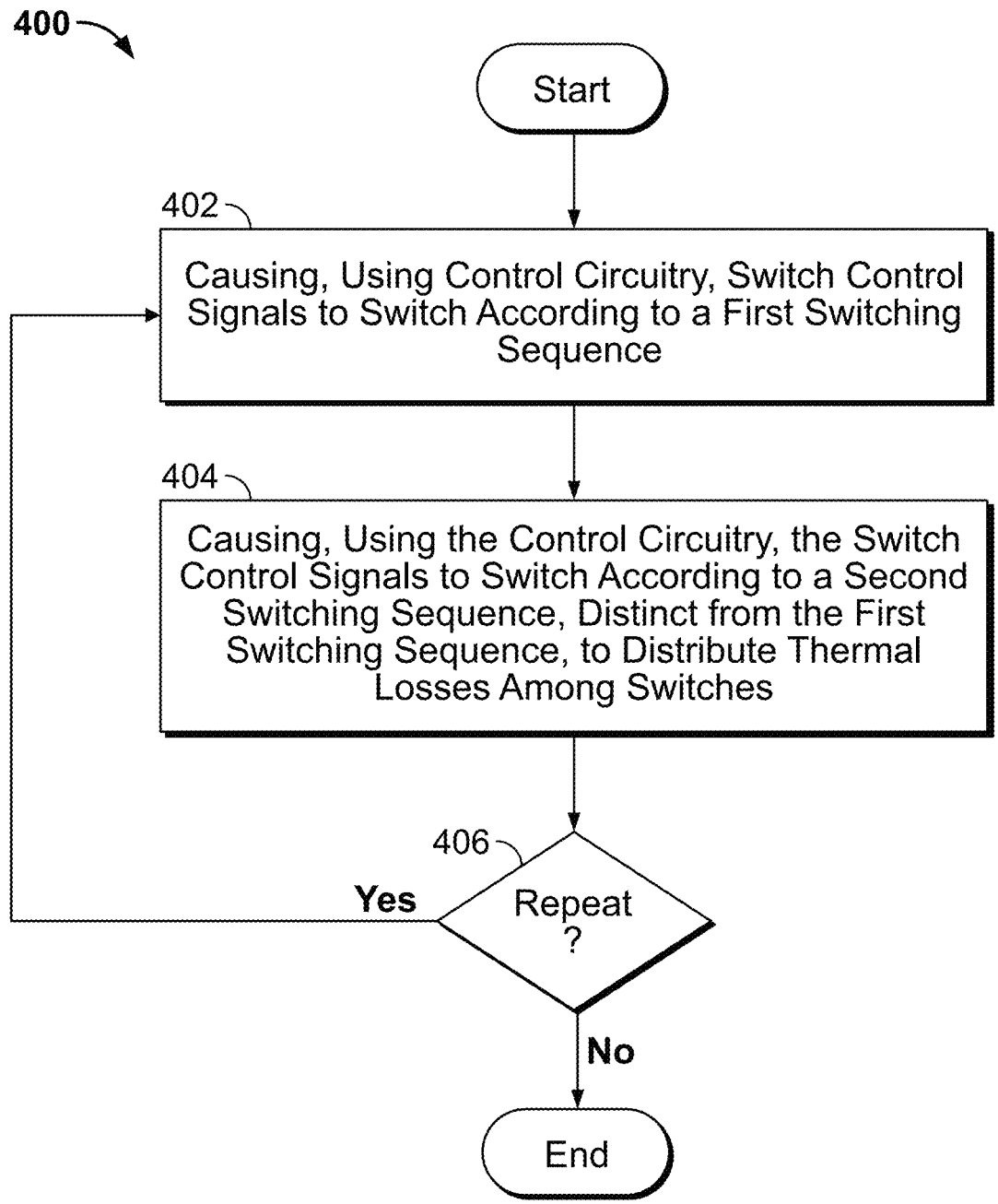
FIG. 4 depicts an illustrative flowchart of a process for controlling a dual active bridge converter with switching loss distribution, in accordance with some embodiments of the disclosure.

FIG. 4 depicts an illustrative flowchart of a process 400 for controlling DAB converter 114 with switching loss distribution, in accordance with some embodiments of the disclosure. A zero-vector modulation method for a full bridge DC-DC converter is proposed by swapping PWM signals at zero current intervals to balance the switching loss between two bridge legs. Different switches (top or bottom) circulate current during zero current intervals periodically. Hence, the duty ratios of the PWMs are changed while the bridge voltage and current remain unchanged.

At 402, control circuitry 112 causes switch control signals (e.g., $S1_{CTL}$, $S2_{CTL}$, $S3_{CTL}$, and $S4_{CTL}$ and/or $S5_{CTL}$, $S6_{CTL}$, $S7_{CTL}$, and $S8_{CTL}$), which are provided to respective switches (e.g., S1, S2, S3, and S4, and/or S5, S6, S7, and S8) of at least one bridge (e.g., primary bridge 220 and/or secondary bridge 222) of DAB converter 114, to switch according to a first switching sequence. Instead of merely repeating only the first switching pattern over and over without swapping to another switching pattern, at 404, at some time after causing switch control signals (e.g., $S1_{CTL}$, $S2_{CTL}$, $S3_{CTL}$, and $S4_{CTL}$ and/or $S5_{CTL}$, $S6_{CTL}$, $S7_{CTL}$, and $S8_{CTL}$) to switch according to the first switching sequence, control circuitry 112 causes switch control signals (e.g., $S1_{CTL}$, $S2_{CTL}$, $S3_{CTL}$, and $S4_{CTL}$ and/or $S5_{CTL}$, $S6_{CTL}$, $S7_{CTL}$, and $S8_{CTL}$) to switch according to a second switching sequence, distinct from the first switching sequence, to distribute switching losses among the switches. An example manner in which control circuitry 112 may cause switch control signals to switch according to first and second switching patterns is described in further detail below.

At 406, control circuitry 112 determines whether to repeat the cycle of swapping switching sequences (e.g., causing switch control signals to switch according to the first switching sequence and then causing switch control signals to switch according to the second switching sequence). Control circuitry 112 may, for instance, read a configurable setting stored in settings 202 that indicates whether switching sequence pattern swapping is enabled for a particular bridge (e.g., primary bridge 220 and/or secondary bridge 222) of DAB converter 114. Such a setting may be statically set or may be dynamic, changing on the fly, for instance, based on temperature sensor feedback as described below. If control circuitry 112 determines to repeat the cycle of swapping switching sequences ("Yes" at 406) then control passes back to 402 to repeat the cycle of swapping switching sequences. In this manner, for instance, control circuitry 112 may repetitively toggle between causing switches to switch according to the first switching sequence and causing the switches to switch according to the second switching sequence, to distribute switching loss among switches. If, on the other hand, control circuitry 112 determines not to repeat the cycle of swapping switching sequences ("No" at 406), then process 400 terminates (e.g., with either the first switching sequence or the second switching sequence remaining in effect).

Figure 5:
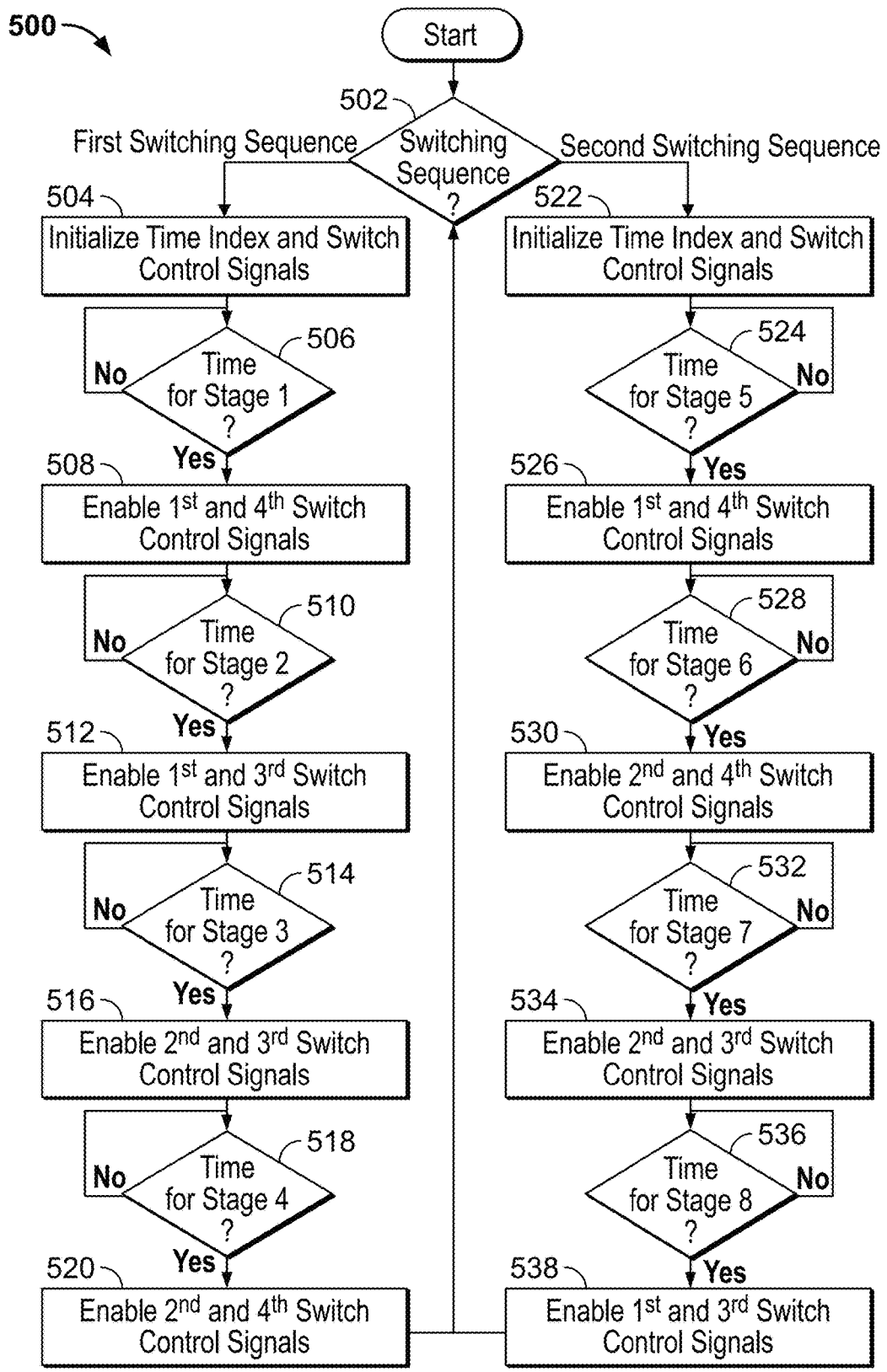
FIG. 5 depicts an illustrative flowchart of a process for causing switch control signals to switch according to a first switching sequence and a second switching sequence, in accordance with some embodiments of the disclosure.

FIG. 5 depicts an illustrative flowchart of a process 500 for causing switch control signals to switch according to a first switching sequence and a second switching sequence, in accordance with some embodiments of the disclosure. The example shown in FIG. 5, in particular, represents a zero-vector modulation method for swapping PWM signals at zero current intervals in a full bridge DC-DC converter to distribute the switching loss (e.g., substantially evenly) in a full bridge to avoid the unbalanced thermal performance of power devices between different bridge legs. Different switches (e.g., top switches 5 and 7 or bottom switches 6 and 8, for secondary bridge 222) circulate current during successive zero current intervals. Hence, the duty ratios of the PWMs are changed while the bridge voltage and current remain unchanged. The turn-off loss is balanced between two bridge legs (e.g., the leg that includes switches S5 and S6 and the leg that includes switches S7 and S8) to help with the thermal management. The swapping frequency (e.g., the frequency at which the first switching sequence and the second switching sequence are swapped in and out of effect for a particular bridge), in some examples, may be relatively slow (e.g., 100 Hz or lower) or fast (e.g., up to half the switching frequency of DAB converter 114). Swapping between first and second switching sequences can flexibly be implemented in either primary bridge 220 or secondary bridge 220, or in both primary bridge 220 and secondary bridge 220, depending on the thermal performance of the system. Such a technique for controlling DAB converter 114 provides better thermal performance for DAB converter 114 operating under a wide voltage range (e.g., for DC fast charging applications and energy storage systems). The technique disclosed herein enables DAB converter 114 to be pushed to a higher power efficiency rating without increasing the cost in thermal management and overdesign of electrical components, helping reduce the thermal burden and overall cost of cooling system design.

Although not shown in FIG. 5, in some examples, control circuitry 112 retrieves, (e.g., from settings 202, instructions 204, and/or rules 206 stored in storage 110), data defining a first switching sequence and/or a second switching sequence, for use in causing switch control signals (e.g., $S1_{CTL}$, $S2_{CTL}$, $S3_{CTL}$, $S4_{CTL}$, $S5_{CTL}$, $S6_{CTL}$, $S7_{CTL}$, and $S8_{CTL}$) to switch according to the first switching sequence and/or the second switching sequence as described below. FIG. 6A depicts data structures 602-1 and 604-1 that may be stored in, and retrieve from, storage 110 and that represent an illustrative time-based first switching sequence and an illustrative second switching sequence, respectively, for utilization in controlling switches of primary bridge 220 of DAB converter 114 with switching loss distribution, in accordance with some embodiments of the disclosure. Data structure 602-1, for instance, includes stage numbers 606-1, time index ranges 608-1, switch identifiers 610-1, and switch control signal values 612-1 defining the first switching sequence. Likewise, data structure 604-1 includes stage numbers 614-1, time index ranges 616-1, switch identifiers 618-1, and switch control signal values 620-1 defining the second switching sequence. For each stage (606-1 or 614-1), the time index range (608-1 or 616-1) indicates a range of times (e.g., within a discretized timeline of a switching sequence) during which certain switches (610-1 or 618-1) are to have certain switch control signal values (612-1 or 620-1).

FIG. 6B depicts data structures 602-2 and 604-2 that may be stored in, and retrieve from, storage 110 and that represent an illustrative time-based first switching sequence and an illustrative second switching sequence, respectively, for utilization in controlling switches of secondary bridge 222 of DAB converter 114 with switching loss distribution, in accordance with some embodiments of the disclosure. Data structure 602-2, for instance, includes stage numbers 606-2, time index ranges 608-2, switch identifiers 610-2, and switch control signal values 612-2 defining the first switching sequence. Likewise, data structure 604-2 includes stage numbers 614-2, time index ranges 616-2, switch identifiers 618-2, and switch control signal values 620-2 defining the second switching sequence. For each stage (606-2 or 614-2), the time index range (608-2 or 616-2) indicates a range of times (e.g., within a discretized timeline of a switching sequence) during which certain switches (610-2 or 618-2) are to have certain switch control signal values (612-2 or 620-2).

At 502, control circuitry 112 determines whether to enable the first switching sequence or the second switching sequence. For instance, control circuitry 112 may read from settings 202 a switching sequence setting (e.g., a flag or a toggle bit) stored in association with a particular bridge (e.g., primary bridge 220 or secondary bridge 222) of DAB converter 114 to make the determination at 502. Alternatively, control circuitry 112 may make the determination at 502 by determining which of the first and second switching sequence was most recently enabled for a particular bridge and automatically selecting the other of the first and second switching sequence at 502 so as to toggle between the first and second switching sequences. If control circuitry 112 determines to enable the first switching sequence ("First switching sequence" at 502), then control passes to 504.

At 504, control circuitry 112 initializes a time index and values of switch control signals. In one example, for primary bridge 220 for illustrative purposes, at 504 control circuitry 112 may set to zero a digital value that represents a discretized temporal offset into a period of the first switching sequence, setting values of switch control signals $S1_{CTL}$, $S2_{CTL}$, $S3_{CTL}$, and $S4_{CTL}$ equal to any desired initialized values for the first switching sequence. Control then passes to 506.

At 506, control circuitry 112 determines whether it is time to enter a first stage (e.g., stage 1) of the first switching sequence. For instance, and with reference to FIG. 6A (using primary bridge 220 as an example, although process 500 is similarly applicable to secondary bridge 222), control circuitry 112 may read a value of an automatically incremented looping digital counter (not shown in the figures) onboard control circuitry 112 and compare the value of the digital counter to a time index range (e.g., 608-1 of FIG. 6A) and determine that it is time to enter the first stage of the first switching sequence if the value of the digital counter indicates a time that falls within the time index range 608-1 associated with stage 1 in data structure 602-1. If control circuitry 112 determines it is not time to enter the first stage of the first switching sequence ("No" at 506), then control remains at 506 to continually (or periodically) repeat the determination. If control circuitry 112 determines it is time to enter the first stage of the first switching sequence ("Yes" at 506), then control passes to 508.

At 508, control circuitry 112 steps into the first stage of the first switching sequence by enabling the first and fourth switch control signals (e.g., setting $S1_{CTL}$ and $S4_{CTL}$ to a logic high level, and setting $S2_{CTL}$ and $S3_{CTL}$ to a logic low level). Unless otherwise stated herein, the value of switching signal S1 is complementary to the value of switching signal S2, the value of switching signal S3 is complementary to the value of switching signal S4, the value of switching signal S5 is complementary to the value of switching signal S6, and the value of switching signal S7 is complementary to the value of switching signal S8. For clarity, certain complementary signals are omitted from certain figures. Control then passes to 510.

At 510, control circuitry 112 determines whether it is time to enter a second stage (e.g., stage 2) of the first switching sequence in a manner similar to how control circuitry 112 made the determination at 506. If control circuitry 112 determines it is not time to enter the second stage of the first switching sequence ("No" at 510), then control remains at 510 to continually (or periodically) repeat the determination, while switch control signals $S1_{CTL}$, $S2_{CTL}$, $S3_{CTL}$, and $S4_{CTL}$ remain at their values for the first stage. If control circuitry 112 determines it is time to enter the second stage of the first switching sequence ("Yes" at 510), then control passes to 512.

At 512, control circuitry 112 steps into the second stage by enabling the first and third switch control signals (e.g., setting $S1_{CTL}$ and $S3_{CTL}$ to a logic high level, and setting $S2_{CTL}$ and $S4_{CTL}$ to a logic low level). Control then passes to 514.

At 514, control circuitry 112 determines whether it is time to enter a third stage (e.g., stage 3) of the first switching sequence in a manner similar to how control circuitry 112 made the determination at 506. If control circuitry 112 determines it is not time to enter the third stage of the first switching sequence ("No" at 514), then control remains at 514 to continually (or periodically) repeat the determination, while switch control signals $S1_{CTL}$, $S2_{CTL}$, $S3_{CTL}$, and $S4_{CTL}$ remain at their values for the second stage of the first switching sequence. If control circuitry 112 determines it is time to enter the third stage of the first switching sequence ("Yes" at 514), then control passes to 516.

At 516, control circuitry 112 steps into the third stage of the first switching sequence by enabling the second and third switch control signals (e.g., setting $S2_{CTL}$ and $S3_{CTL}$ to a logic high level, and setting $S1_{CTL}$ and $S4_{CTL}$ to a logic low level). Control then passes to 518.

At 518, control circuitry 112 determines whether it is time to enter a fourth stage (e.g., stage 4) of the first switching sequence in a manner similar to how control circuitry 112 made the determination at 506. If control circuitry 112 determines it is not time to enter the fourth stage of the first switching sequence ("No" at 518), then control remains at 518 to continually (or periodically) repeat the determination, while switch control signals $S1_{CTL}$, $S2_{CTL}$, $S3_{CTL}$, and $S4_{CTL}$ remain at their values for the third stage of the first switching sequence. If control circuitry 112 determines it is time to enter the fourth stage of the first switching sequence ("Yes" at 518), then control passes to 520.

At 520, control circuitry 112 steps into the fourth stage of the first switching sequence by enabling the second and fourth switch control signals (e.g., setting $S2_{CTL}$ and $S4_{CTL}$ to a logic high level, and setting $S1_{CTL}$ and $S3_{CTL}$ to a logic low level). Control then passes back to 502 to repeat the determination of which switching sequence to implement for the particular bridge.

If control circuitry 112 determines to enable the second switching sequence ("Second switching sequence" at 502), then control passes to 522. At 522, control circuitry 112 initializes a time index and values of switch control signals. In one example, for primary bridge 220 for illustrative purposes, at 504 control circuitry 112 may set to zero a digital value that represents a discretized temporal offset into a period of the first switching sequence, setting values of switch control signals $S1_{CTL}$, $S2_{CTL}$, $S3_{CTL}$, and $S4_{CTL}$ equal to any desired initialized values for the second switching sequence. Control then passes to 524.

At 524, control circuitry 112 determines whether it is time to enter a fifth stage (e.g., stage 5) of the second switching sequence. For instance, and with reference to FIG. 6A, control circuitry 112 may read a value of an automatically incremented looping digital counter (not shown in the figures) onboard control circuitry 112 and compare the value of the digital counter to a time index range (e.g., 616-1 of FIG. 6A) and determine that it is time to enter the fifth stage of the second switching sequence if the value of the digital counter indicates a time that falls within the time index range 616-1 associated with stage 5 in data structure 604-1. If control circuitry 112 determines it is not time to enter the fifth stage of the second switching sequence ("No" at 524), then control remains at 524 to continually (or periodically) repeat the determination. If control circuitry 112 determines it is time to enter the fifth stage of the second switching sequence ("Yes" at 524), then control passes to 526.

At 526, control circuitry 112 steps into the fifth stage of the second switching sequence by enabling the first and fourth switch control signals (e.g., setting $S1_{CTL}$ and $S4_{CTL}$ to a logic high level, and setting $S2_{CTL}$ and $S3_{CTL}$ to a logic low level). Control then passes to 528.

At 528, control circuitry 112 determines whether it is time to enter a sixth stage (e.g., stage 6) of the second switching sequence in a manner similar to how control circuitry 112 made the determination at 506. If control circuitry 112 determines it is not time to enter the sixth stage of the second switching sequence ("No" at 528), then control remains at 528 to continually (or periodically) repeat the determination, while switch control signals $S1_{CTL}$, $S2_{CTL}$, $S3_{CTL}$, and $S4_{CTL}$ remain at their values for the fifth stage of the second switching sequence. If control circuitry 112 determines it is time to enter the sixth stage of the second switching sequence ("Yes" at 528), then control passes to 530.

At 530, control circuitry 112 steps into the sixth stage of the second switching sequence by enabling the second and fourth switch control signals (e.g., setting $S2_{CTL}$ and $S4_{CTL}$ to a logic high level, and setting $S1_{CTL}$ and $S3_{CTL}$ to a logic low level). Control then passes to 532.

At 532, control circuitry 112 determines whether it is time to enter a seventh stage (e.g., stage 7) of the second switching sequence in a manner similar to how control circuitry 112 made the determination at 506. If control circuitry 112 determines it is not time to enter the seventh stage of the second switching sequence ("No" at 532), then control remains at 532 to continually (or periodically) repeat the determination, while switch control signals $S1_{CTL}$, $S2_{CTL}$, $S3_{CTL}$, and $S4_{CTL}$ remain at their values for the sixth stage of the second switching sequence. If control circuitry 112 determines it is time to enter the seventh stage of the second switching sequence ("Yes" at 532), then control passes to 534.

At 534, control circuitry 112 steps into the seventh stage of the second switching sequence by enabling the second and third switch control signals (e.g., setting $S2_{CTL}$ and $S3_{CTL}$ to a logic high level, and setting $S1_{CTL}$ and $S4_{CTL}$ to a logic low level). Control then passes to 536.

At 536, control circuitry 112 determines whether it is time to enter an eighth stage (e.g., stage 8) of the second switching sequence in a manner similar to how control circuitry 112 made the determination at 506. If control circuitry 112 determines it is not time to enter the eighth stage of the second switching sequence ("No" at 536), then control remains at 536 to continually (or periodically) repeat the determination, while switch control signals $S1_{CTL}$, $S2_{CTL}$, $S3_{CTL}$, and $S4_{CTL}$ remain at their values for the seventh stage of the first switching sequence. If control circuitry 112 determines it is time to enter the eighth stage of the second switching sequence ("Yes" at 536), then control passes to 538.

At 538, control circuitry 112 steps into the eighth stage of the second switching sequence by enabling the first and third switch control signals (e.g., setting $S1_{CTL}$ and $S3_{CTL}$ to a logic high level, and setting $S2_{CTL}$ and $S4_{CTL}$ to a logic low level). Control then passes back to 502 to repeat the determination of which switching sequence to implement for the particular bridge.

Figure 7:
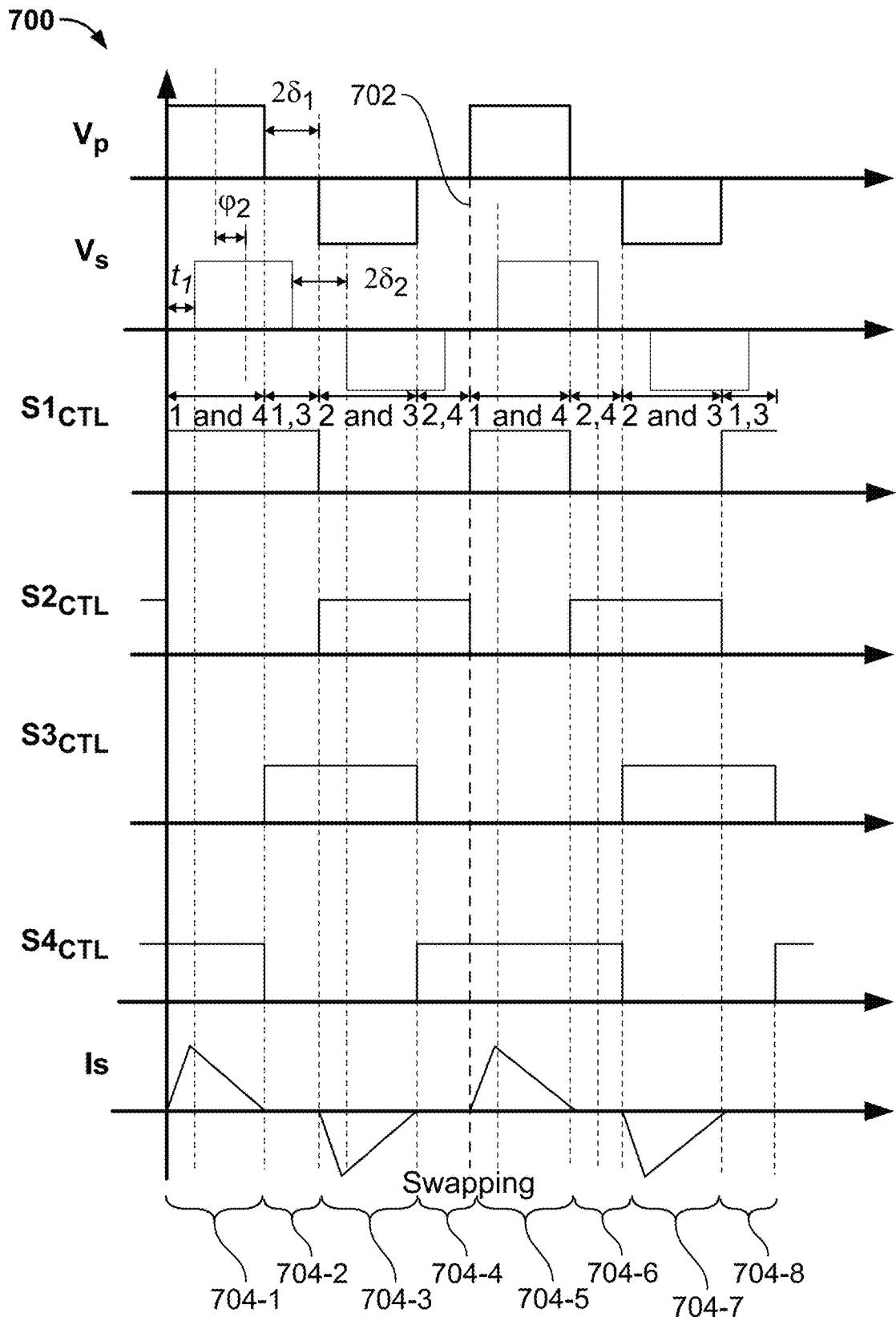
FIG. 7 depicts an illustrative voltage timing diagram of switch control signals of a primary bridge of a dual active bridge converter with switching loss distribution, in accordance with some embodiments of the disclosure.

FIG. 7 depicts an illustrative voltage timing diagram 700 showing the first and second switching sequences (e.g., PWM switching sequences described above in connection with FIGS. 5 and 6A) of switch control signals $S1_{CTL}$, $S2_{CTL}$, $S3_{CTL}$, and $S4_{CTL}$ of primary bridge 220 of DAB converter 114 with switching loss distribution, and showing primary (Vp) and secondary (Vs) voltages of transformer 218 that result from such a switching pattern, in accordance with some embodiments of the disclosure. In some examples, the PWM patterns and bridge voltage/current relations shown in FIG. 7 are utilized for DAB converter 114 operating in buck mode, where balancing primary bridge legs is desired. As can be seen from FIG. 7, at time point 702, control circuitry 112 swaps between utilizing the first switching sequence and utilizing the second switching sequence. In particular, prior to time point 702, control circuitry 112 causes switch control signals $S1_{CTL}$, $S2_{CTL}$, $S3_{CTL}$, and $S4_{CTL}$ to switch according to a first switching sequence (e.g., the first switching sequence defined by data structure 602-1 in FIG. 6A), and after time point 702, control circuitry 112 causes switch control signals $S1_{CTL}$, $S2_{CTL}$, $S3_{CTL}$, and $S4_{CTL}$ to switch according to a second switching sequence (e.g., the second switching sequence defined by data structure 604-1 in FIG. 6A). In some examples, stages 1, 2, 3, and 4 (606-1) of data structure 602-1 correspond to time ranges 704-1, 704-2, 704-3, and 704-4, respectively, of FIG. 7.

Figure 8:
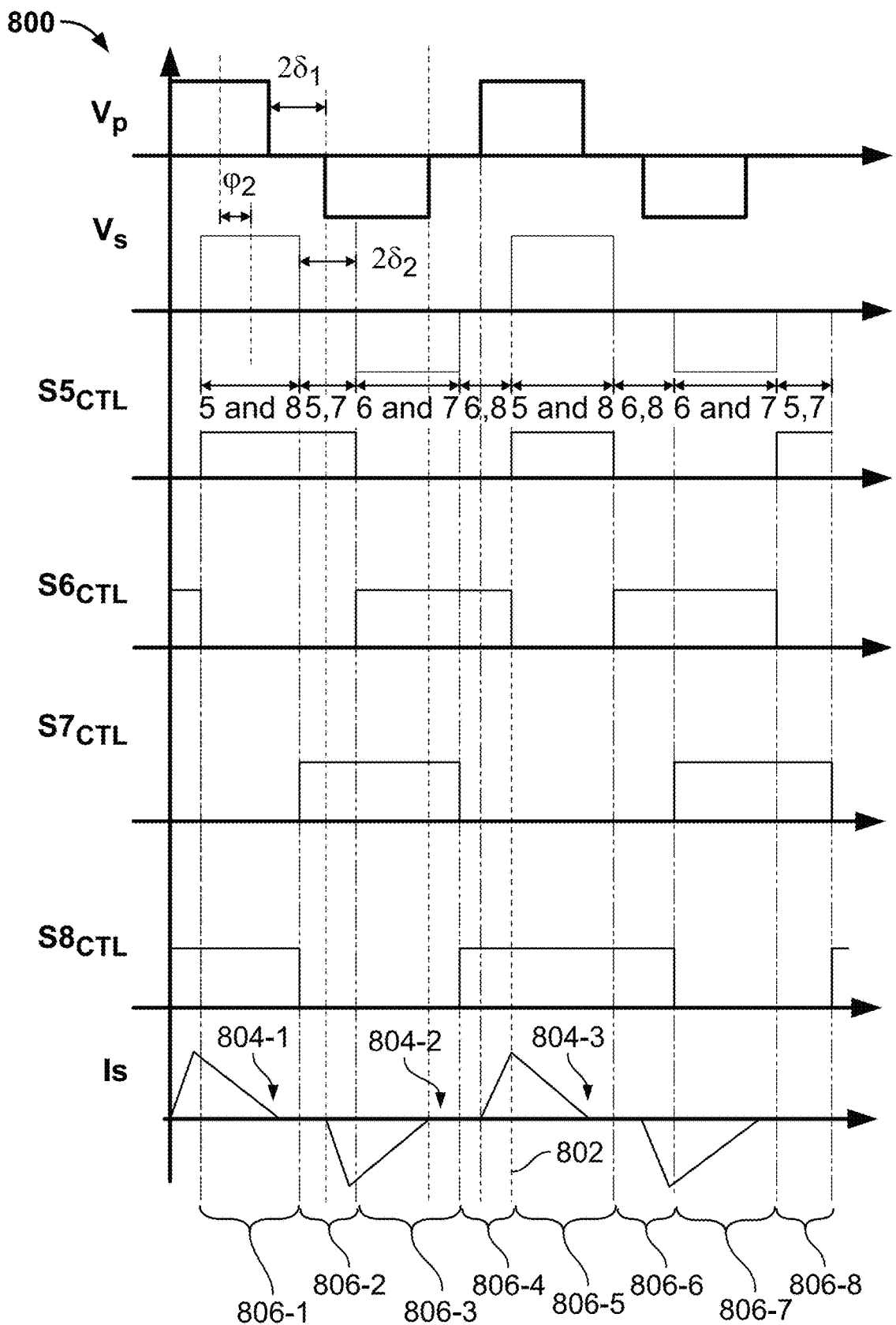
FIG. 8 depicts an illustrative voltage timing diagram of switch control signals of a secondary bridge of a dual active bridge converter with switching loss distribution, in accordance with some embodiments of the disclosure.

FIG. 8 depicts an illustrative voltage timing diagram 800 showing the first and second switching sequences (e.g., PWM switching sequences described above in connection with FIGS. 5 and 6) of switch control signals $S5_{CTL}$, $S6_{CTL}$, $S7_{CTL}$, and $S8_{CTL}$ of secondary bridge 222 of DAB converter 114 with switching loss distribution, and showing primary (Vp) and secondary (Vs) voltages of transformer 218 that result from such a switching pattern, in accordance with some embodiments of the disclosure. In some examples, the PWM patterns and bridge voltage/current relations shown in FIG. 8 are utilized for DAB converter 114 operating in boost mode, where balancing secondary bridge legs is desired. As can be seen from FIG. 8, at time point 802, control circuitry 112 swaps between utilizing the first switching sequence and utilizing the second switching sequence. Top switches S5 and S7 are on (e.g., with $S5_{CTL}$ and $S7_{CTL}$ set to a logic high level) within at least a portion of the first zero current interval 804-1, bottom switches S6 and S8 (bottom) are on (e.g., with $S6_{CTL}$ and $S8_{CTL}$ set to a logic high level) within at least a portion of the second zero current interval 804-2, and bottom switches S6 and S8 are on (e.g., with $S6_{CTL}$ and $S8_{CTL}$ set to a logic high level) within at least a portion of the third zero current interval 804-3. Thus, either switch S5 or switch S7 is periodically turned off at a peak current level. Depending on the swapping frequency, the non-periodic zero current intervals can be different. The swapping frequency, in some examples, may be relatively slow (e.g., 100 Hz or lower) or fast (e.g., up to half the switching frequency of DAB converter 114). The swapping time interval, in some aspects, may be configured to be slightly longer than a thermal time constant of a junction-to-case thermal impedance of one or more of the switches.

Figure 9:
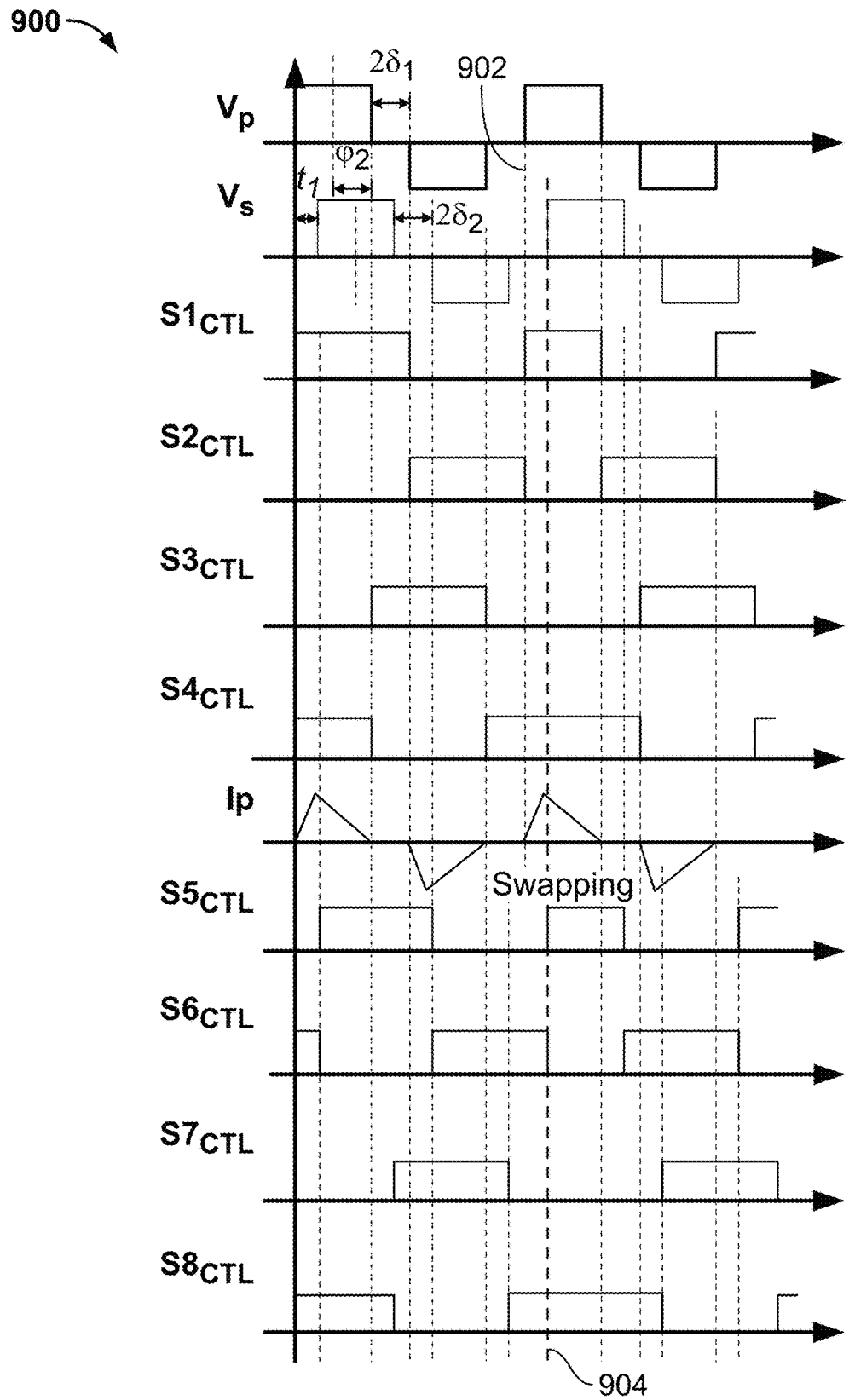
FIG. 9 depicts an illustrative voltage timing diagram of switch control signals of both a primary bridge and a secondary bridge of a dual active bridge converter with switching loss distribution, in accordance with some embodiments of the disclosure.

FIG. 9 depicts an illustrative voltage timing diagram 900 showing the first and second switching sequences (e.g., PWM switching sequences described above in connection with FIGS. 5 and 6) of switch control signals $S1_{CTL}$, $S2_{CTL}$, $S3_{CTL}$, and $S4_{CTL}$ of primary bridge 220 and switch control signals $S5_{CTL}$, $S6_{CTL}$, $S7_{CTL}$, and $S8_{CTL}$ of secondary bridge 222 of DAB converter 114 with switching loss distribution, and showing primary (Vp) and secondary (Vs) voltages of transformer 218 that result from such switching sequences, in accordance with some embodiments of the disclosure. In some examples, the PWM patterns and bridge voltage/current relations shown in FIG. 8 are utilized for DAB converter 114 where balancing both primary and secondary bridges 220, 222 is desired. As can be seen from FIG. 9, at time point 902, control circuitry 112 swaps between utilizing the first switching sequence and utilizing the second switching sequence for primary bridge 220, and at time point 904, control circuitry 112 swaps between utilizing the first switching sequence and utilizing the second switching sequence for secondary bridge 222. In particular, prior to time point 902, control circuitry 112 causes switch control signals $S1_{CTL}$, $S2_{CTL}$, $S3_{CTL}$, and $S4_{CTL}$ to switch according to a first switching sequence (e.g., the first switching sequence defined by data structure 602-1 in FIG. 6A), and after time point 902, control circuitry 112 causes switch control signals $S1_{CTL}$, $S2_{CTL}$, $S3_{CTL}$, and $S4_{CTL}$ to switch according to a second switching sequence (e.g., the second switching sequence defined by data structure 604-1 in FIG. 6A). Likewise for secondary bridge 222, prior to time point 904, control circuitry 112 causes switch control signals $S5_{CTL}$, $S6_{CTL}$, $S7_{CTL}$, and $S8_{CTL}$ to switch according to a first switching sequence (e.g., the first switching sequence defined by data structure 602-2 in FIG. 6B), and after time point 904, control circuitry 112 causes switch control signals $S5_{CTL}$, $S6_{CTL}$, $S7_{CTL}$, and $S8_{CTL}$ to switch according to a second switching sequence (e.g., the second switching sequence defined by data structure 604-2 in FIG. 6B).

Figure 10:
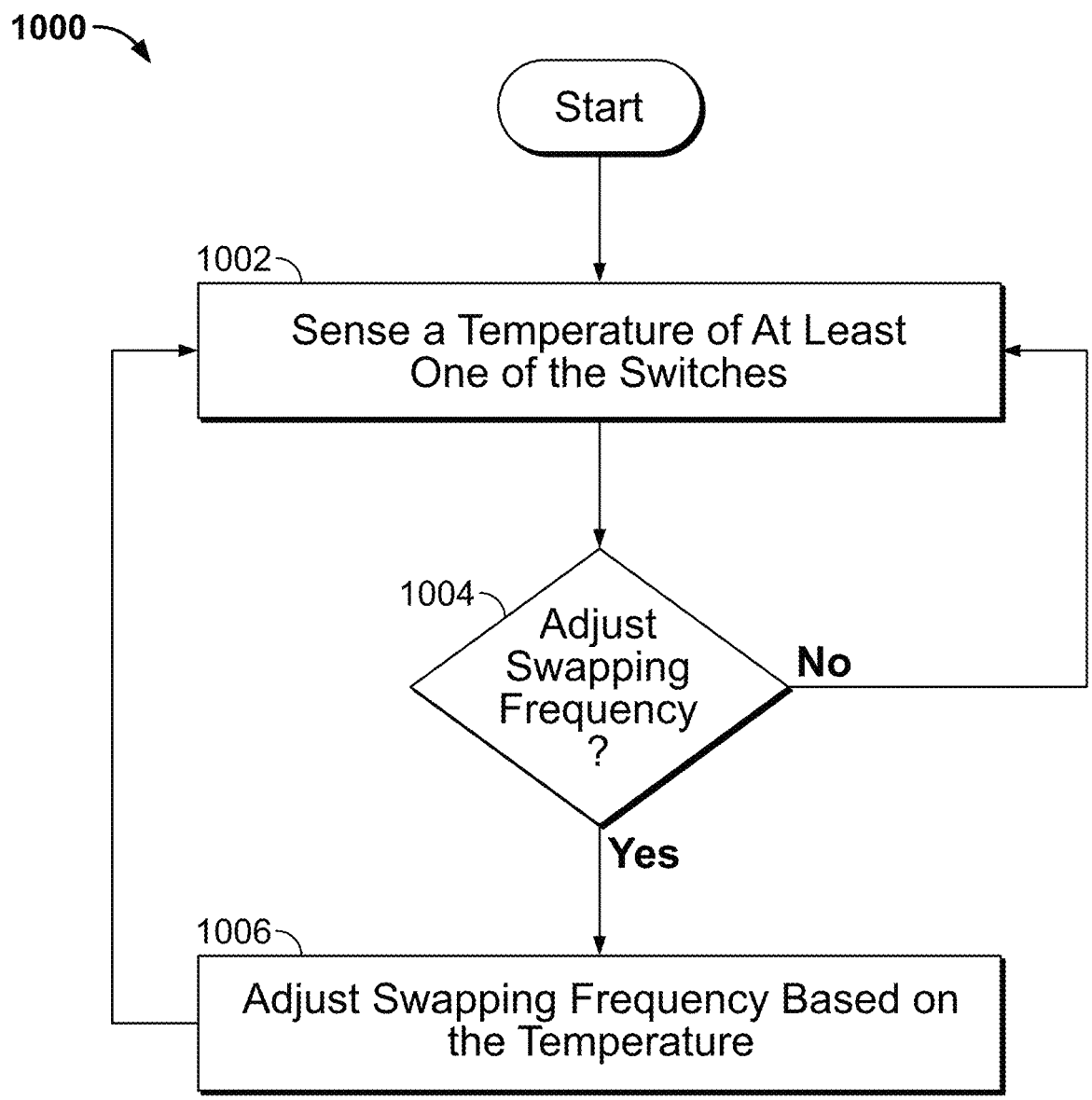
FIG. 10 depicts an illustrative flowchart of a process for adjusting a swapping frequency based on switch temperature feedback, in accordance with some embodiments of the disclosure.

FIG. 10 depicts an illustrative flowchart of a process 1000 for adjusting a swapping frequency based on switch temperature feedback, in accordance with some embodiments of the disclosure. At 1002, control circuitry 112 senses a temperature of at least one of the switches. At 1004, control circuitry 112 determines whether to adjust a swapping frequency based on the temperature. For instance, control circuitry 112 may compare the sensed temperature to a predetermined threshold stored in storage 110 and determine to increase the swapping frequency if the temperature exceeds the threshold. In one example, control circuitry 112 may keep the swapping frequency set to zero to effectively disable switching sequence swapping, keeping a single switching sequence in effect for a period of time. Control circuitry 112, for instance, may determine that switching sequence swapping is unnecessary in cases when switch temperatures are below a threshold. In other examples, the swapping frequency may be set to change in a manner that leaves one particular switching sequence enabled longer than another switching sequence, for instance, to reduce the heat of certain switches. For instance, the swapping frequency may be set to a very low value for one switching cycle to prolong a duration during which a particular switching sequence (e.g., a first switching sequence) is enabled. Then the swapping frequency may be increased for a subsequent switching cycle to shorten a duration during which another switching sequence (e.g., a second switching sequence) is enabled. If control circuitry 112 determines not to adjust a swapping frequency based on the temperature ("No" at 1004), control passes back to 1002 to obtain an updated temperature reading for the switch(es). If control circuitry 112 determines to adjust a swapping frequency based on the temperature ("Yes" at 1004), control passes to 1006. At 1006, control circuitry 112 adjusts a swapping frequency based on the sensed switch temperature. In some examples, control circuitry 112 may determine, based on the swapping frequency, a time (e.g., within a first or second switching sequence) at which to toggle between causing the switches to switch according to the first switching sequence and causing the switches to switch according to the second switching sequence.

Figure 11:
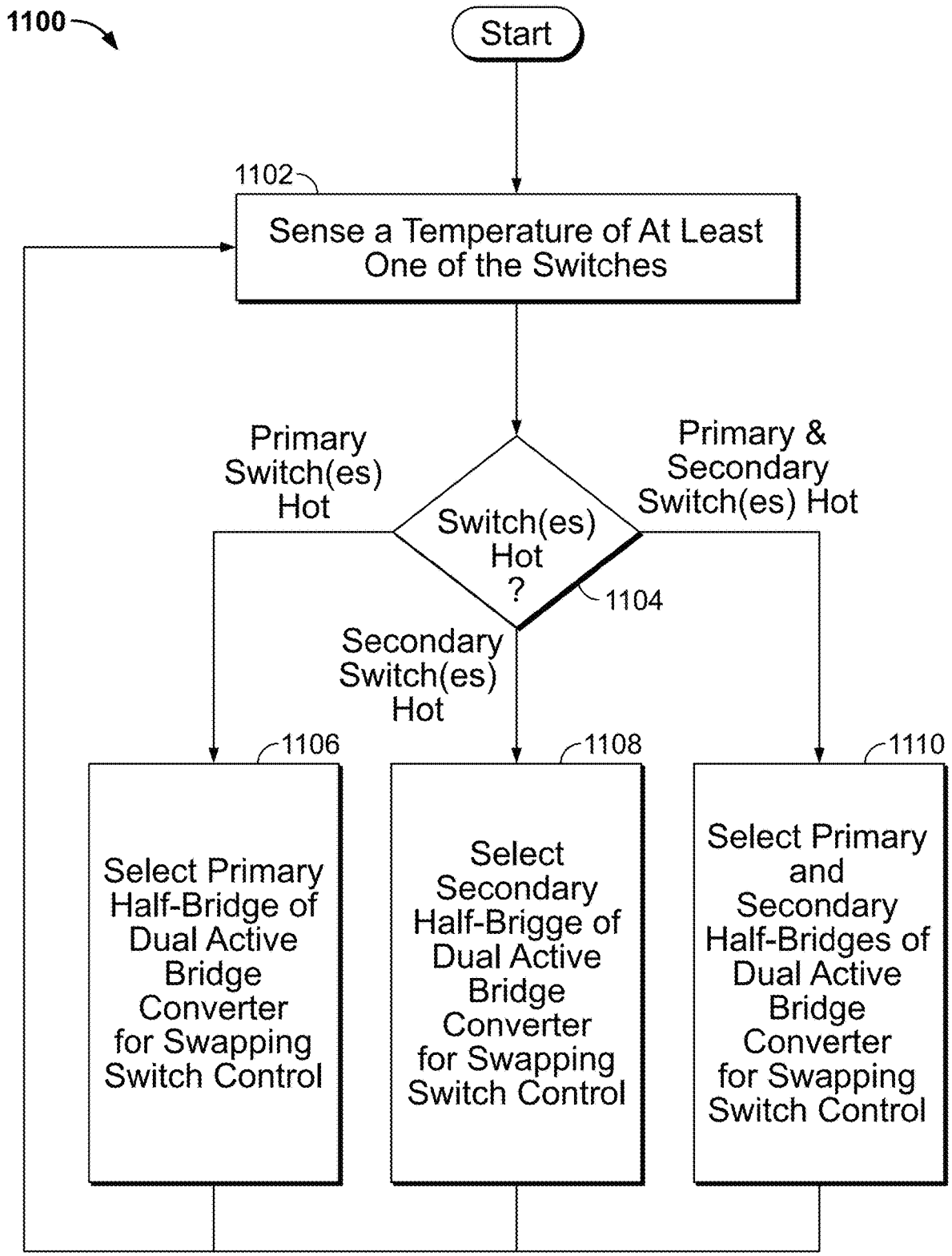
FIG. 11 depicts an illustrative flowchart of a process for selecting a primary and/or secondary bridge of a dual active bridge converter for swapping switch control based on temperature feedback, in accordance with some embodiments of the disclosure.

FIG. 11 depicts an illustrative flowchart of a process 1100 for selecting a primary and/or secondary bridge of a dual active bridge converter for swapping switch control based on temperature feedback, in accordance with some embodiments of the disclosure. In some examples, control circuitry 112 independently selects primary bridge 220 and/or secondary bridge 222 for swapping switch control to independently balance thermal losses among switches of primary bridge 220 and secondary bridge 222 based on temperature feedback. At 1102, control circuitry 112 senses a temperature of at least one of the switches of primary bridge 220 and/or secondary bridge 222. At 1104, control circuitry 112 determines which, if any, of the switches are hot (e.g., whether the sensed temperature(s) exceed a threshold). If control circuitry 112 determines that one or more switches of primary bridge 220 are hot ("Primary Switch(es) Hot" at 1104), control passes to 1106, at which control circuitry 112 selects, for swapping between first and second switching sequences, primary bridge 220 of DAB converter 114, based on the sensed temperature(s). If control circuitry 112 determines that one or more switches of secondary bridge 222 are hot ("Secondary Switch(es) Hot" at 1104), control passes to 1108, at which control circuitry 112 selects, for swapping between first and second switching sequences, secondary bridge 222 of DAB converter 114, based on the sensed temperature(s). If control circuitry 112 determines that one or more switches of primary bridge 220 and one or more switches of secondary bridge 222 are hot ("Primary & Secondary Switch(es) Hot" at 1104), control passes to 1110, at which control circuitry 112 selects, for swapping between first and second switching sequences, both primary bridge 220 and secondary bridge 222 of DAB converter 114, based on the sensed temperature.

Figure 12:
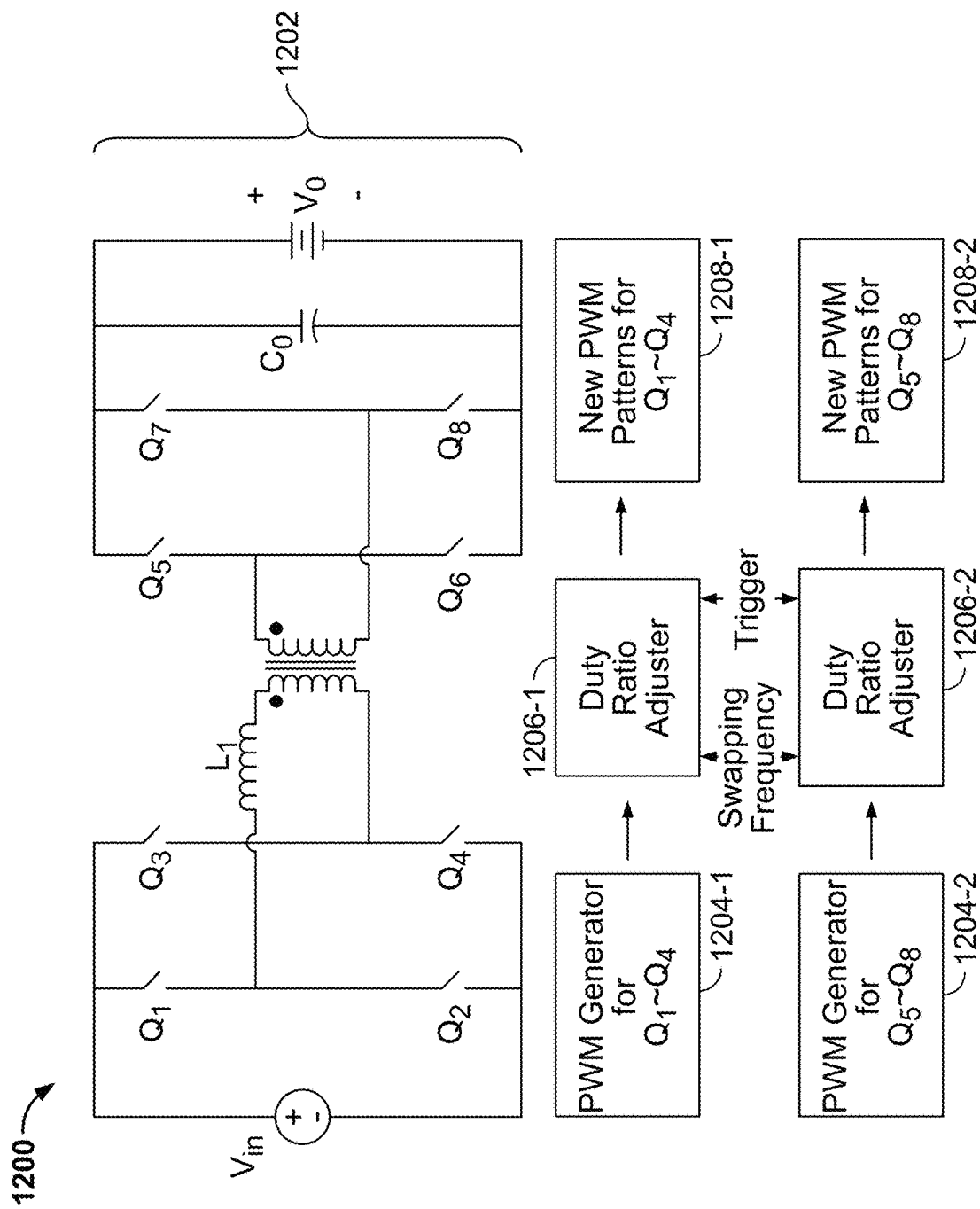
FIG. 12 depicts an illustrative structure for controlling a dual active bridge converter with switching loss distribution, in accordance with some embodiments of the disclosure.

FIG. 12 depicts an illustrative structure 1200 for controlling a dual active bridge converter with switching loss distribution, in accordance with some embodiments of the disclosure. In some examples, switches Q1 through Q8 of FIG. 12 correspond to switches S1 through S8 shown elsewhere in the figures and described elsewhere herein. Structure 1200 includes a DAB converter 1202; PWM generator 1204-1 for switches Q1, Q2, Q3, and Q4; PWM generator 1204-2 for switches Q5, Q6, Q7, and Q8; and duty ratio adjusters 1206-1 and 1206-2 Since the duty ratio is changed instead of the phase shifted angle between legs, a comparator can be used as the duty ratio adjuster to modulate the duty ratio information of the PWM patterns. In some aspects, a center aligned PWM duty ratio configuration is utilized for robust protection against different noise, and to yield better sensor readings during sampling. Whereas the duty ratios of the switch control signals remain constant throughout successive switching cycles of the conventional PWM switching pattern shown in FIG. 3, the duty ratios of switch control signals vary across successive switching cycles of the PWM switching patterns shown in FIGS. 7, 8, and 9. In the example of FIG. 12, switching sequences of switches are controlled by utilizing duty ratio adjusters 1206-1 and 1206-2 to modify respective duty ratios for each switch of DAB converter 114 to yield the desired switching sequence (e.g., switching sequences 602-1, 602-2. 604-1, and/or 604-2 of FIGS. 6A and 6B). In particular, duty ratio adjuster 1206-1 may comprise comparators for each of switches Q1 through Q4, with one input (e.g., the non-inverting input) of each of the comparators being fed with a sinusoidal signal set to the switching frequency of DAB converter 114, and the other input of the comparator (e.g., an inverting input) being fed with an adjustable voltage signal (e.g., by using an adjustable voltage divider coupled to a fixed voltage supply). Each adjustable voltage signal may be independently adjusted to yield the desired duty ratio for the corresponding switch. In some examples, control circuitry 112 generates a first PWM waveform (e.g., 1204-1 and/or 1204-2; first switching sequence) for use during a first switching cycle, and, based on a swapping frequency (e.g., read from storage 110) and a trigger (e.g., based on temperature sensing as described above), utilizes duty ratio adjusters 1206-1 and/or 1206-2 to modify duty ratios of switching signals, thereby generating a secondary PWM waveform (e.g., 1208-1 and/or 1208-2; second switching sequence) for use during a second switching cycle.

Figure 13:
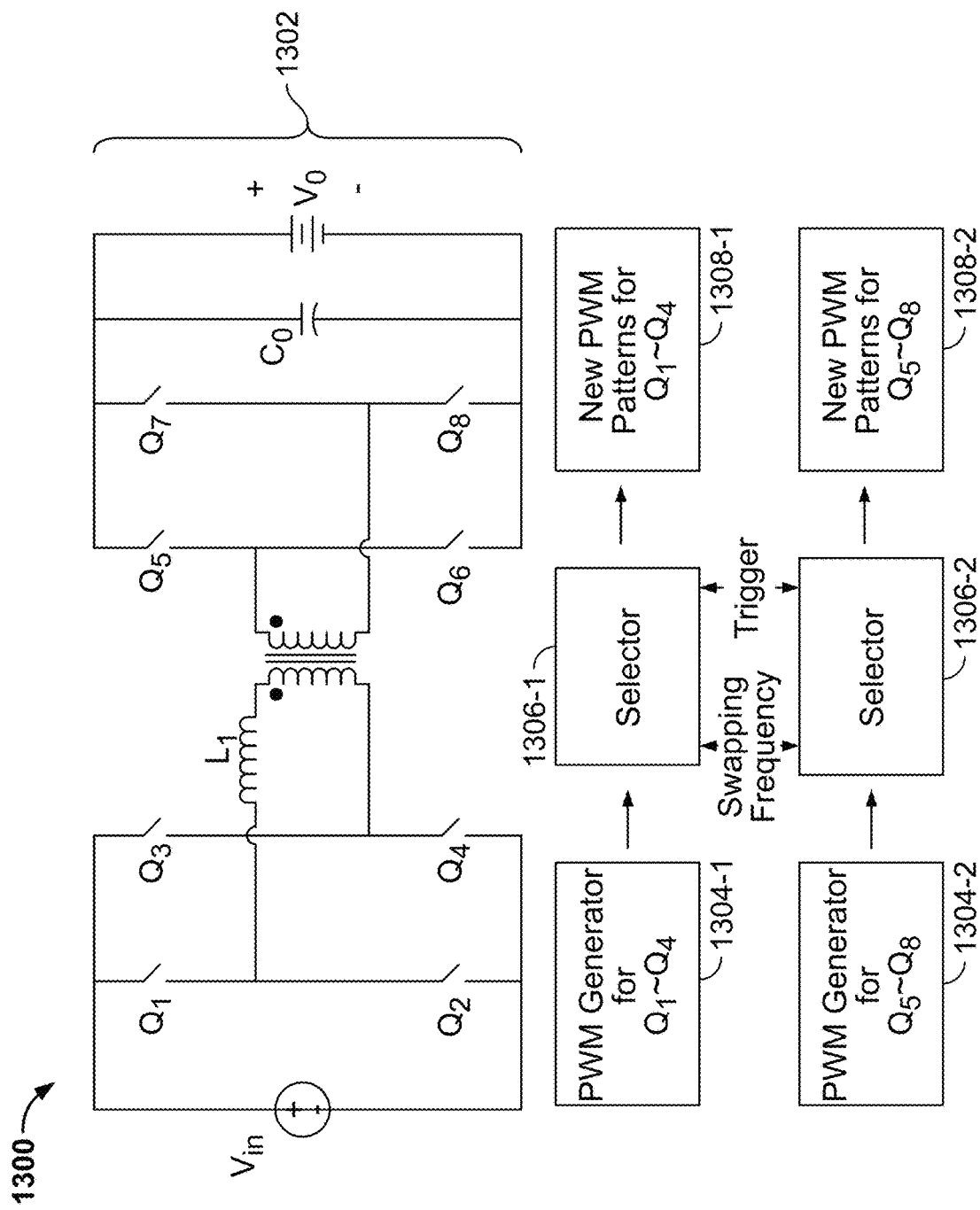
FIG. 13 depicts another illustrative structure for controlling a dual active bridge converter with switching loss distribution, in accordance with some embodiments of the disclosure.

FIG. 13 depicts another illustrative structure 1300 for controlling a dual active bridge converter with switching loss distribution, in accordance with some embodiments of the disclosure. In some examples, switches Q1 through Q8 of FIG. 13 correspond to switches S1 through S8 shown elsewhere in the figures and described elsewhere herein. Structure 1300 includes a DAB converter 1302; PWM generator 1304-1 for switches S1, S2, S3, and S4; PWM generator 1304-2 for switches S5, S6, S7, and S8; and duty ratio adjusters 1306-1 and 1306-2. In some examples, control circuitry 112 toggles between utilizing a primary PWM waveform (e.g., 1304-1 and/or 1304-2; first switching sequence) and utilizing a secondary PWM waveform (e.g., 1308-1 and/or 1308-2; second switching sequence) based on a swapping frequency (e.g., read from storage 110) and a trigger (e.g., based on temperature sensing as described above).

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted that the systems and/or methods described above may be applied to, or used in accordance with, other systems and/or methods.

What is claimed is:

1. A method for controlling first, second, third, and fourth switches of a bridge of a dual active bridge converter, comprising:
   causing, using control circuitry, the switches to switch according to a first switching sequence comprising:
      sequentially stepping through a first stage during which the first and fourth switches are enabled, a second stage during which the first and third switches are enabled, a third stage during which the second and third switches are enabled, and a fourth stage during which the second and fourth switches are enabled;
   causing, using the control circuitry, the switches to switch according to a second switching sequence, distinct from the first switching sequence, comprising:
      sequentially stepping through a fifth stage during which the first and fourth switches are enabled, a sixth stage during which the second and fourth switches are enabled, a seventh stage during which the second and third switches are enabled, and an eighth stage during which the first and third switches are enabled; and
   repetitively toggling, based on a swapping frequency, between causing the switches to switch according to the first switching sequence and causing the switches to switch according to the second switching sequence to distribute switching losses among the switches.

2. The method of claim 1,
wherein causing the switches to switch comprises providing a first switch control signal, a second switch control signal, a third switch control signal, and a fourth switch control signal to the first switch, the second switch, the third switch and the fourth switch, respectively, of the switches of the bridge.

3. The method of claim 2, further comprising:
causing the first switch control signal to have a value complementary to a value of the second switch control signal; and
causing the third switch control signal to have a value complementary to a value of the fourth switch control signal.

4. The method of claim 1, wherein the dual active bridge converter comprises a transformer having a primary side and a secondary side, and wherein the switches of the bridge are switches of a primary bridge of the dual active bridge converter coupled to the primary side of the transformer.

5. The method of claim 1, wherein the dual active bridge converter comprises a transformer having a primary side and a secondary side, and wherein the switches of the bridge are switches of a secondary bridge of the dual active bridge converter coupled to the secondary side of the transformer.

6. The method of claim 1, further comprising determining, based on the swapping frequency, a time at which to toggle between causing the switches to switch according to the first switching sequence and causing the switches to switch according to the second switching sequence.

7. The method of claim 6, further comprising:
sensing a temperature of at least one of the switches; and
adjusting the swapping frequency based on the temperature.

8. The method of claim 6, wherein the dual active bridge converter comprises a transformer having a primary side and a secondary side, and wherein the method further comprises:
sensing a temperature of at least one of the switches; and
selecting, as the bridge of the dual active bridge converter, at least one of (i) a primary bridge of the dual active bridge converter coupled to the primary side of the transformer or (ii) a secondary bridge of the dual active bridge converter coupled to the secondary side of the transformer, based on the sensed temperature.

9. The method of claim 1, further comprising:
retrieving, from memory, data defining at least one of the first switching sequence or the second switching sequence,
wherein the switches are caused to switch according to at least one of the first switching sequence or the second switching sequence based on the retrieved data.

10. The method of claim 1, further comprising determining the swapping frequency based on a thermal time constant of the switches.

11. A system for controlling a dual active bridge converter, comprising:
memory storing instructions;
output ports; and
control circuitry coupled to the memory and the output ports and configured to execute the instructions to:
provide switch control signals via the output ports to first, second, third, and fourth switches of at least one bridge of the dual active bridge converter;
cause the switches to switch according to a first switching sequence comprising:
sequentially stepping through a first stage during which the first and fourth switches are enabled, a second stage during which the first and third switches are enabled, a third stage during which the second and third switches are enabled, and a fourth stage during which the second and fourth switches are enabled;
cause the switches to switch according to a second switching sequence, distinct from the first switching sequence, comprising:
sequentially stepping through a fifth stage during which the first and fourth switches are enabled, a sixth stage during which the second and fourth switches are enabled, a seventh stage during which the second and third switches are enabled, and an eighth stage during which the first and third switches are enabled; and
repetitively toggle, based on a swapping frequency, between causing the switches to switch according to the first switching sequence and causing the switches to switch according to the second switching sequence to distribute switching losses among the switches.

12. The system of claim 11,
wherein causing the switches to switch comprises providing a first switch control signal, a second switch control signal, a third switch control signal, and a fourth switch control signal to the first switch, the second switch, the third switch and the fourth switch, respectively, of the switches of the at least one bridge of the dual active bridge converter.

13. The system of claim 12, wherein the control circuitry is further configured to execute the instructions to:
cause the first switch control signal to have a value complementary to a value of the second switch control signal; and
cause the third switch control signal to have a value complementary to a value of the fourth switch control signal.

14. The system of claim 11, wherein the dual active bridge converter comprises a transformer having a primary side and a secondary side, and wherein the switch control signals are provided to the first, second, third, and fourth switches of a primary bridge of the dual active bridge converter coupled to the primary side of the transformer.

15. The system of claim 11, wherein the dual active bridge converter comprises a transformer having a primary side and a secondary side, and wherein the switch control signals are provided to the first, second, third, and fourth switches of a secondary bridge of the dual active bridge converter coupled to the secondary side of the transformer.

16. The system of claim 11, wherein the control circuitry is further configured to execute the instructions to determine, based on the swapping frequency, a time at which to toggle between causing the switches to switch according to the first switching sequence and causing the switches to switch according to the second switching sequence.

17. The system of claim 16, wherein the control circuitry is further configured to execute the instructions to:
receive, from a sensor, a temperature of at least one of the switches; and
adjust the swapping frequency based on the temperature.

18. The system of claim 16, wherein the dual active bridge converter comprises a transformer having a primary side and a secondary side, and wherein the control circuitry is further configured to execute the instructions to:
receive, from a sensor, a temperature of at least one of the switches; and
select, as the at least one bridge of the dual active bridge converter, at least one of (i) a primary bridge of the dual active bridge converter coupled to the primary side of the transformer or (ii) a secondary bridge of the dual active bridge converter coupled to the secondary side of the transformer, based on the sensed temperature.

19. The system of claim 11, wherein the memory is further configured to store data defining at least one of the first switching sequence or the second switching sequence, and the control circuitry is further configured to execute the instructions to:
   retrieve the data from the memory; and
   cause the switch control signals to switch according to at least one of the first switching sequence or the second switching sequence based on the retrieved data.

20. The system of claim 11, wherein the control circuitry is further configured to execute the instructions to determine the swapping frequency based on a thermal time constant of the switches.

* * * * *